US012634196B2

(12) United States Patent
Goliya et al.

(10) Patent No.: US 12,634,196 B2
(45) Date of Patent: *May 19, 2026

(54) SCALING OF LOGICAL ROUTER PODS

(71) Applicant: VMware LLC, Palo Alto, CA (US)

(72) Inventors: Abhishek Goliya, Pune (IN); Yu Ying, Cupertino, CA (US); Yong Wang, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/752,352

(22) Filed: Jun. 24, 2024

(65) Prior Publication Data

US 2025/0080411 A1      Mar. 6, 2025

Related U.S. Application Data

(63) Continuation of application No. 18/239,923, filed on Aug. 30, 2023, now Pat. No. 12,021,682.

(51) Int. Cl.
*H04L 41/0803* (2022.01)
*H04L 41/0893* (2022.01)
(52) U.S. Cl.
CPC ...... *H04L 41/0803* (2013.01); *H04L 41/0893* (2013.01)
(58) Field of Classification Search
CPC ............. H04L 41/0803; H04L 41/0893; H04L 41/0895; H04L 41/40
See application file for complete search history.

(56) References Cited

U.S. PATENT DOCUMENTS

| | | | |
|---|---|---|---|
| 10,944,691 | B1 | 3/2021 | Raut |
| 2020/0241863 | A1 | 7/2020 | Duvur |
| 2021/0314300 | A1 | 10/2021 | Shen et al. |
| 2023/0028922 | A1 | 1/2023 | Wang |
| 2023/0161631 | A1 | 5/2023 | Sharma |
| 2023/0228837 | A1 | 7/2023 | Kazmi |

OTHER PUBLICATIONS

Anonymous, Releases—Traefik / Traefik, https://github.com/traefik/traefik/releases?page=7, Jun. 22, 2023, pp. 1-9.
Anonymous, Routing Configuration for Traefik CRD | Traefik | v2.9, https://doc.traefik.io/traefik/v2.9/routing/providers/kubernetes-crd/, Apr. 24, 2023, pp. 1-19.
European Patent Office, Extended Search Report, Application No. 24196149.9, Feb. 5, 2025, 10 pages.

*Primary Examiner* — Benjamin M Thieu
(74) *Attorney, Agent, or Firm* — Quarles & Brady LLP

(57) ABSTRACT

Some embodiments provide a method for configuring logical routers of a logical network. The logical routers are implemented in a Kubernetes cluster as a first set of Pods that each perform logical forwarding operations for the logical routers and a second set of Pods that each perform L7 service operations for a respective logical router. From a Kubernetes control plane component, the method receives a notification that the first set requires scaling to include an additional Pod. The first-set Pods process data messages between the logical network and external networks. Within the network management system, the method defines at least one new interface for processing data messages between the logical network and external networks. The method configures the at least one interface on the additional Pod to communicate with external physical routers to receive traffic from the external networks and send traffic to the external networks.

20 Claims, 21 Drawing Sheets

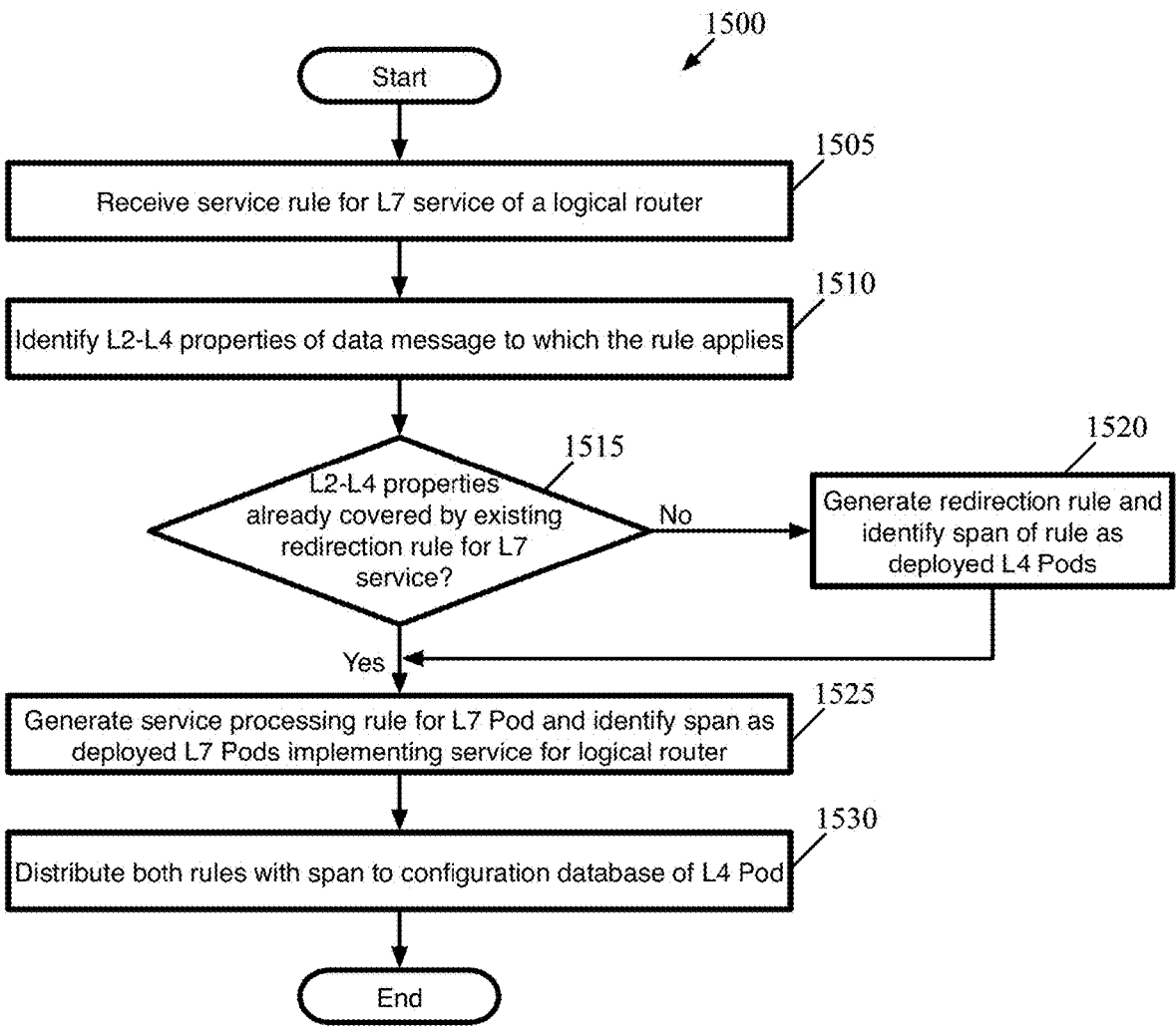

1500

Start

Receive service rule for L7 service of a logical router — 1505

Identify L2-L4 properties of data message to which the rule applies — 1510

L2-L4 properties already covered by existing redirection rule for L7 service? — 1515

No

Generate redirection rule and identify span of rule as deployed L4 Pods — 1520

Yes

Generate service processing rule for L7 Pod and identify span as deployed L7 Pods implementing service for logical router — 1525

Distribute both rules with span to configuration database of L4 Pod — 1530

End

*Figure 15*

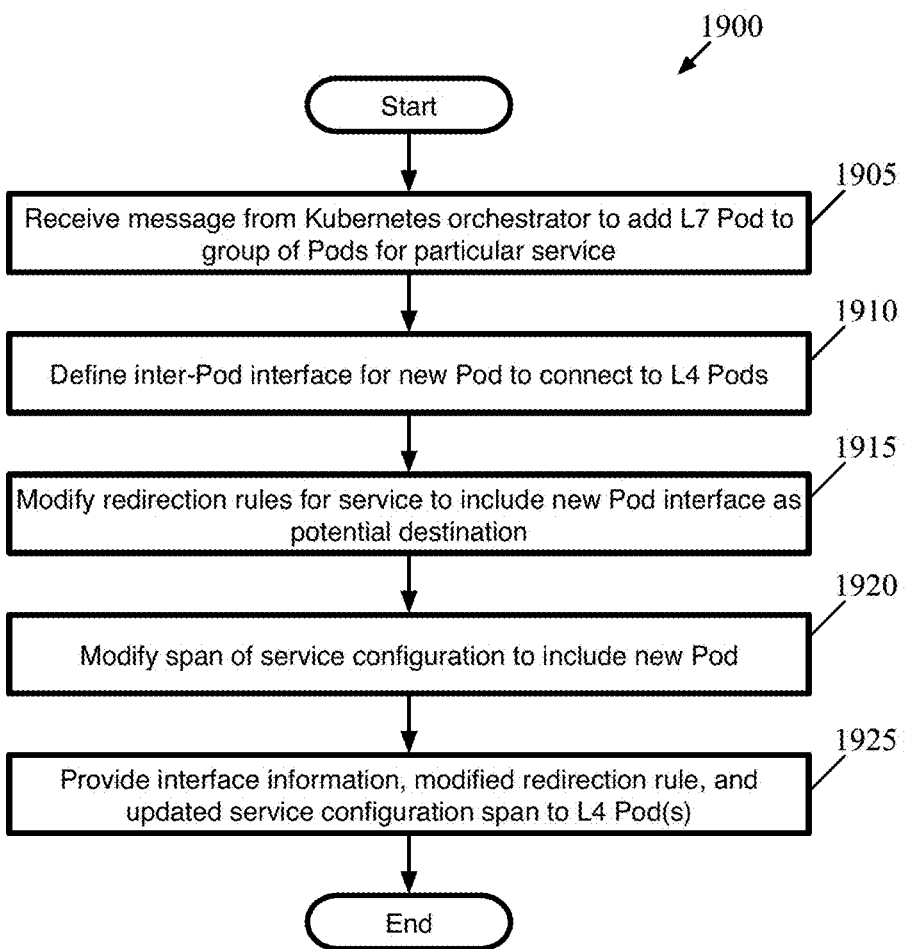

1900

Start

Receive message from Kubernetes orchestrator to add L7 Pod to group of Pods for particular service ⟋ 1905

Define inter-Pod interface for new Pod to connect to L4 Pods ⟋ 1910

Modify redirection rules for service to include new Pod interface as potential destination ⟋ 1915

Modify span of service configuration to include new Pod ⟋ 1920

Provide interface information, modified redirection rule, and updated service configuration span to L4 Pod(s) ⟋ 1925

End

*Figure 19*

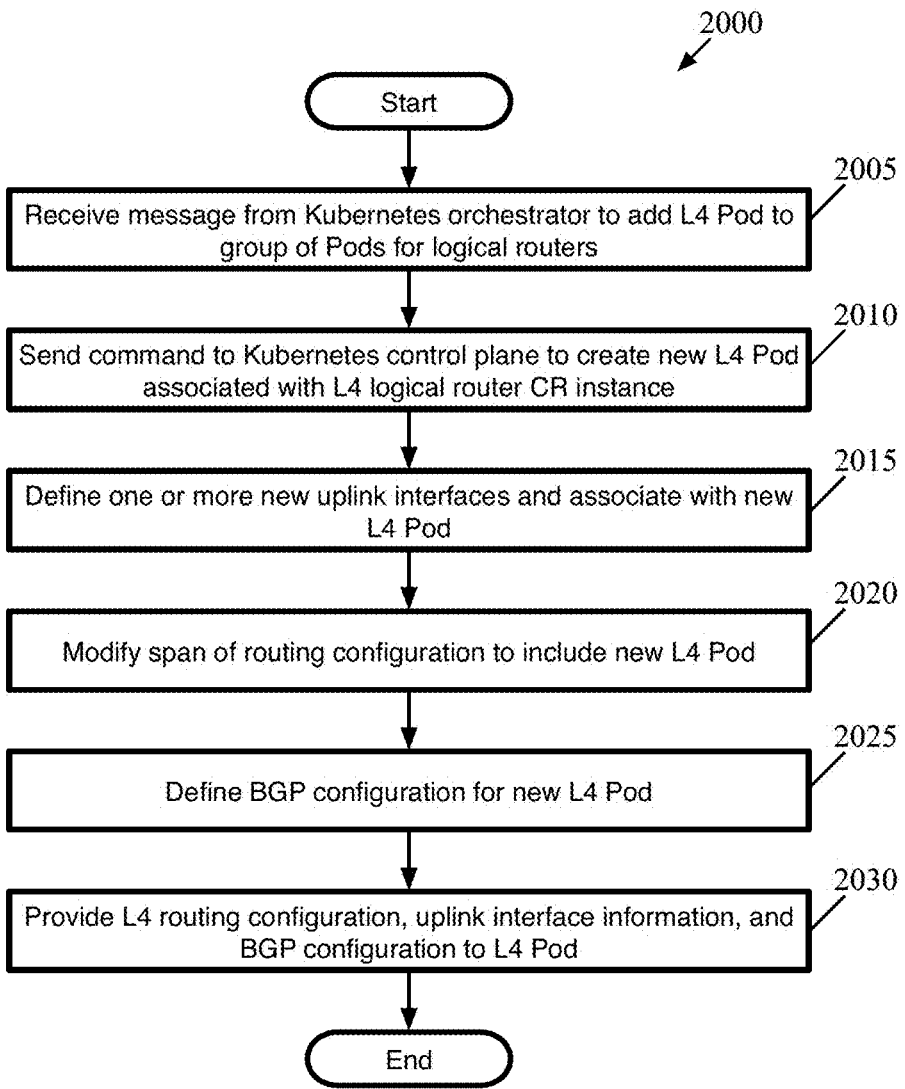

2000

Start

Receive message from Kubernetes orchestrator to add L4 Pod to group of Pods for logical routers — 2005

Send command to Kubernetes control plane to create new L4 Pod associated with L4 logical router CR instance — 2010

Define one or more new uplink interfaces and associate with new L4 Pod — 2015

Modify span of routing configuration to include new L4 Pod — 2020

Define BGP configuration for new L4 Pod — 2025

Provide L4 routing configuration, uplink interface information, and BGP configuration to L4 Pod — 2030

End

*Figure 20*

SCALING OF LOGICAL ROUTER PODS

CROSS-REFERENCE TO RELATED APPLICATIONS

This application is a continuation of U.S. patent application Ser. No. 18/239,923 filed on Aug. 30, 2023, the disclosure of which is incorporated by reference herein.

BACKGROUND

Today, Kubernetes is the de-facto orchestration platform that automates the process of deploying and managing micro-service-based cloud-native applications at massive scale. However, unique challenges exist with how networking functions can leverage the benefits offered by Kubernetes, such as better scalability, resiliency, and elasticity. These unique challenges exist partly due to network function virtualization (NFV) data plane functions differing greatly from web and database applications where Kubernetes has been proven to be mostly successful.

Edge node architecture is often based on a monolithic appliance model. For example, some edge nodes use a datapath built on Data Plane Development Kit (DPDK), which is a widely used kernel-bypassing networking technology designed to maximize networking performance. DPDK moves control of the networking hardware out of the kernel and into the application, thus removing the overhead of context switches and kernel-user-space crossing, along with other optimizations. The current multi-tenancy high performance edge appliances based on this architecture work well, in particular for layer 4 (L4) services that are tightly integrated with the DPDK poll mode driver (PMD) threads. However, with more networking and security functions moving to the application layer (L5-L7), this architecture has shown its limitations.

BRIEF SUMMARY

Some embodiments of the invention provide a network management system for implementing a logical network, including one or more logical routers, in a container cluster (e.g., a Kubernetes cluster) having multiple nodes that each execute a set of Pods. In some embodiments, the network management system is external to the container cluster and maintains state of the logical network. In some embodiments, each of a set of the logical routers of a logical network performs layer 7 services (e.g., TLS proxy, load balancing service) on at least a subset of the logical network data traffic that the logical router processes. Each of these logical routers has its functionality divided across multiple Pods. Specifically, some embodiments deploy a first Pod (or set of Pods) that performs data forwarding operations (e.g., layer 2-layer 4 operations) for multiple logical routers as well as one or more separate Pods for each of these logical routers to perform services (e.g., layer 7 service operations) for its respective logical router.

The logical routers (along with the other elements of the logical network) are defined through the network management system in some embodiments, with this definition including a set of L7 services to be performed on at least a subset of data messages processed by the logical router. In some embodiments, the network management system defines at least a first logical router within the container cluster as two or more separate custom resource (CR) instances. Specifically, via the control plane of the container cluster (e.g., executing on a master node of the Kubernetes cluster), the network management system defines (i) a first CR instance that is associated with a first CR definition (CRD) for implementing logical forwarding for the logical router and (ii) separate CR instances associated with a second CRD for implementing each L7 service defined for the logical router. The cluster control plane defines a first set of Pods for the first CR instance and a separate set of Pods for each of the CR instances defined for L7 services. In other embodiments, the network management system defines a single CR instance for the L7 services of the logical router as a whole and a set of Pods is then defined by the cluster control plane for this CR instance.

In some embodiments, assuming a single Pod is defined to perform data forwarding operations for multiple logical routers (referred to herein as an "L4 Pod"), the cluster controllers assign this L4 Pod to a specific first node of the cluster and then distribute the Pods for performing L7 services of the logical router (referred to herein as "L7 Pods") across a set of worker nodes (possibly including the first node). Some embodiments affinitize the L4 Pod to the first node (i.e., so that this Pod is pinned to this node) while the L7 Pods may be moved between the nodes based on resource usage or other factors.

Each L4 pod, in some embodiments, executes a data plane development kit (DPDK) datapath that uses a set of run-to-completion threads for processing data messages sent to the logical router as well as a set of control threads for handling control plane operations. Each run-to-completion thread, in some embodiments, is assigned to a different core of a set of cores of a computing device on which the L4 Pod executes (or virtual cores of a virtual machine on which the L4 Pod executes), while the set of control threads are scheduled between the cores of the computing device. The set of data message processing operations performed by the L4 pod (e.g., by the datapath) includes layer 2-layer 4 (L2-L4) operations, such as L2/L3 lookups, tunnel termination/encapsulation, L2-L4 firewall processing, packet updating, and byte counters.

As mentioned, in some embodiments, the logical routers belong to a logical network. This logical network connects network endpoints (e.g., various applications), which may also execute on Pods of the cluster, to each other as well as to external endpoints. In some embodiments, the logical network includes logical switches that logically connect directly to the network endpoints, a first tier of logical routers for interfacing with external networks, and a second tier of logical routers interposed between the first-tier logical router and logical switches and which provide administrator-configured L7 services for data traffic entering and exiting the logical switches. The first-tier logical routers may also provide administrator-configured L7 services for data traffic entering and exiting the logical network, in some embodiments. In some embodiments, logical routers of either tier are implemented by the L4 and L7 Pods. Logical routers without any L7 services defined are implemented only by the L4 Pod.

Each logical router is configured (e.g., by a network administrator) to perform a respective set of services on data messages handled by that logical router, and the set of service operations performed by the L7 Pods for these logical routers includes the respective set of services configured for the logical router. These services, in some embodiments, include L5-L7 services, such as L7 firewall services, transport layer security (TLS) services (e.g., TLS proxy), L7 load balancing services, uniform resource locator (URL) filtering, and domain name service (DNS) forwarding. In some embodiments, if multiple such services are configured for a given logical router, each of these services is implemented by a separate set of L7 Pods.

In some embodiments, each L4 Pod implements (i) a single first-tier logical router as well as (ii) any number of second-tier logical routers (i.e., all of the logical routers defined to connect to that first-tier logical router). In some such embodiments, the network management system defines a single CR instance of the first CRD with the Kubernetes control plane as well as numerous instances of the second CRD. The network management system defines the CR instance of the first CRD upon initial configuration of the first-tier logical router, and any subsequently configured second-tier logical routers that connect to that first-tier logical router are associated with that initial CR instance.

On the other hand, when any new logical router is configured (either the initial first-tier logical router or a second-tier logical router connecting to that first-tier logical router), the network management system defines new CR instances for any L7 services configured for the new logical router. Some embodiments define separate CR instances for each individual L7 service (e.g., if TLS proxy and L7 load balancing are configured for a logical router, two separate CR instances are defined), while other embodiments define one CR instance for a logical router irrespective of the number of different L7 services configured.

In some embodiments, for each CR instance the network management system defines with the Kubernetes control plane, the network management system also specifies an initial number of Pods to deploy. That is, the network management system specifies the initial number of L4 Pods to deploy as well as the initial number of L7 Pods to deploy for each L7 service (or for each logical router if one L7 Pod handles all of the services for a logical router). The cluster control plane, in some embodiments, deploys the Pods based directly on the creation of the CR instances. In other embodiments, the cluster control plane deploys L4 Pods based on direction from the network management system but deploys L7 Pods based on direction from an agent executing on the L4 Pod.

To initially deploy an L4 Pod (or multiple Pods), the network management system generates a Pod specification in some embodiments for the L4 Pod. The Pod specification may specify a container image to use, the allocated memory and/or CPU, initialization scripts, and security policies for the Pod. In some embodiments, the container image specifies the applications to be executed in the Pod, including the datapath as well as a set of network management system components (e.g., a configuration database and a set of agents). This specification data is passed to the cluster control plane (e.g., the Kubernetes API server), which initiates action on the Kubernetes back-end to create the Pod on a particular node of the cluster (typically the node is selected by the Kubernetes scheduling controller). In some embodiments, the Pod specification for the L4 Pod is provided when the network management system defines the CR instance for the L4 Pod(s) with the Kubernetes control plane.

In some embodiments, the specification for the L4 Pod also indicates a physical connectivity requirement. That is, the L4 Pod has a requirement that it have direct access (possibly through ingress mechanisms of the container cluster) to a set of one or more external physical routers. Depending on the applications executing on logical network endpoints, the external physical routers may provide connection to the public Internet and/or to a private connection to other datacenters (e.g., an enterprise datacenter). As such, the container cluster is required to assign the L4 Pod (which, as noted above is affinitized to a specific worker node) to a node that provides this connectivity. The configuration for the first-tier logical router as defined at the network management system specifies a set of one or more uplink interfaces (or groups of interfaces), which are the interfaces that connect to the external router.

Once the L4 Pod is instantiated, the network management system can provide logical router configuration to the L4 Pod. Specifically, in some embodiments, a central control plane of the network management system determines that the span of each logical router implemented by the L4 Pod includes that Pod and therefore distributes the logical routing configuration to a configuration database (e.g., NestDB) stored on the L4 Pod. A network management system agent that executes on the L4 Pod identifies the logical routing configuration data in this database and uses the configuration data to configure the datapath executing on the L4 Pod. This logical routing configuration data, in some embodiments, includes configuration for both the first-tier logical router as well as the second-tier logical routers implemented by the L4 Pod.

The network management system agent configures the datapath to handle both incoming and outgoing data traffic in some embodiments. An incoming data message (i.e., received at the L4 Pod from the external router) is initially processed according to the first-tier logical router configuration. In some embodiments, if any L7 services are configured for the first-tier logical router, the incoming data message is redirected to the L7 Pods that implement those services. If not, or once all of the L7 services have been performed, the datapath routes the data message to one of the second-tier logical routers (i.e., based on the destination address of the data message). L7 services may also be configured for the second-tier logical router to which the incoming data message is routed, and the datapath is therefore configured to route the data message to L7 Pods that implement each of these services. Once all of the services have been performed and the data message is returned to the L4 Pod (assuming the data message is not dropped by one of the L7 Pods according to the service configuration), the datapath performs any additional logical forwarding operations (e.g., routing the data message to a particular logical switch and then applying the logical switch configuration to identify the eventual logical network destination for the data message) to send the data message to its eventual destination. In some embodiments, that destination is a logical network endpoint within the container cluster (e.g., another Pod implementing at least one aspect of an application deployed within the cluster). Forwarding the data message to the endpoint may involve tunneling the data message through the network of the container cluster in some embodiments.

Outgoing data messages are initially processed at the source of the data message (e.g., at the Pod that is the source of the data message or by a container network interface plugin on the same node to which that source Pod connects) and sent to the L4 Pod upon determination that the data message requires logical router processing (based on, e.g., logical switching or distributed logical router processing). The L4 Pod initially applies the configuration for a second-tier logical router to which the data message was sent. The datapath may identify the particular second-tier logical router based on information appended to the data message (e.g., as part of an encapsulation header), the source of the data message, or another mechanism. As with incoming data messages, the second-tier logical router configuration may specify for the datapath to redirect the outgoing data message to one or more L7 Pods for services to be applied to the data message. Once all of these services have been applied, the datapath routes the data message to the first-tier logical router, which may have its own L7 services configured. Once all services for the first-tier logical router have been applied, the datapath routes the data message to one of the external routers (assuming the data message has not been dropped).

The datapath, in different embodiments, may use a single combined routing table or separate routing tables (e.g., virtual routing and forwarding (VRF) tables) for each of the logical routers. In addition, in some embodiments, the datapath is configured with policy-based routing rules (i.e., rules that do not strictly depend on the destination network address of data messages) that take precedence (i.e., that have higher priority) to handle redirection of data messages to the L7 Pods. For instance, when applying the configuration for a particular second-tier logical router, the L4 Pod applies the policy-based redirection rules to determine whether any services need to be applied to the data message prior to routing the data message based on its destination network address to an external router or a logical network endpoint. In some embodiments, the redirection rules are generated by the network management system based on the service configurations for the logical routers, as described in more detail below.

In addition, the network management system provides a routing protocol (e.g., Border Gateway Protocol (BGP)) configuration for the L4 Pod. In some embodiments, the L4 Pod executes a routing protocol application (either as one of the control threads of the datapath or as a separate process from the datapath). This routing protocol application peers with the external router (via the uplink interfaces of the first-tier logical router) in order to attract traffic from the external router. In some embodiments, the routing protocol application is configured to advertise various logical network subnets (and/or public IP addresses) to the external router. These subnets and/or public IP addresses, in some embodiments, are specified in the configuration of the various second-tier logical routers at the network management system. Each second-tier logical router may be configured to advertise various network addresses relating to the logical switches that connect to that logical router. This configuration is transferred to the first-tier logical router as this is the logical router that connects to the external network and therefore actually advertises the network addresses to the external routers.

The routing protocol application also learns routes from the external router(s). For an external router that provides connectivity to other datacenters, these learned routes may include various logical network subnets available through that external router at the other datacenters. When the L4 Pod interfaces with multiple external routers, a default route may route traffic to one of the external routers (e.g., via one of the uplink interfaces) but different routes can be learned for different external network addresses via the routing protocol application.

In addition to configuring the routing for the L4 Pod (both the routing protocol application as well as the datapath), the network management system provides configuration data for the L7 Pods. In some embodiments, the L4 Pod is also responsible in part for configuring the L7 Pods for the logical routers for which it implements logical routing. The L4 Pod, in some embodiments, receives service configuration data for a given logical router from the network management system, provides Pod definition data to the container cluster control plane (e.g., the Kubernetes API server) to create an L7 Pod, and then communicates directly with the L7 Pod to further configure that Pod. Specifically, in some embodiments, the L4 Pod provides to the L7 Pod (i) networking information to enable a connection for data messages between the L4 and L7 Pods and (ii) configuration data that defines the L7 services for the L7 Pod to perform on the data messages sent from the L4 Pod to the L7 Pod (i.e., via said connection enabled by the networking information).

In some embodiments, in addition to the datapath and network management system agent, the L4 Pod executes a Pod configuration agent that is responsible for the creation and at least part of the configuration of the L7 Pods for the various logical routers implemented by the L4 Pod. For a given logical router with at least one L7 service configured, the Pod configuration agent first provides Pod definition data to the cluster controller to create the L7 Pod in the container cluster. In some embodiments, the Pod configuration agent generates a yaml (Yaml Ain't Markup Language) file that defines the specifications for the Pod, which may be based on configuration data from the network management system that is stored in the configuration database. In some embodiments, the Pod specification can include the container image to use (e.g., the application to be executed in the Pod, depending on the type of service(s) to be executed by the Pod), the allocated memory and/or CPU, initialization scripts, and security policies for the Pod. This specification data is passed to the controller cluster (e.g., the Kubernetes API server), which initiates action within the Kubernetes control plane to create the Pod on a particular node of the cluster (typically the node is selected by the Kubernetes scheduling controller). Unlike the L4 Pod, there is no external connectivity requirement for the L7 Pods, as they only need to be able to communicate with the L4 Pod.

When the L7 Pod is created, this Pod will typically have a default interface (generally referred to as eth0). However, some embodiments define a second interface for the inter-Pod connection (e.g., an L2 connection) between the L7 Pod and the L4 Pod. This connection is used when the datapath at the L4 Pod redirects data messages to the L7 Pod for service processing. In some embodiments, the network management system defines these interfaces (e.g., assigns network addresses) and provides the interface information to the L4 Pod (i.e., to the configuration database on the L4 Pod). Once the L7 Pod has been created, the Pod configuration agent distributes the network interface configuration attributes defined by the network management system (e.g., MAC address, VLAN ID, and IP address) to the L7 Pod (e.g., via Kubernetes ConfigMap). In some embodiments, this causes the L7 Pod to execute a script to configure a new interface (e.g., eth1) for the inter-Pod connectivity with the datapath executing in the L4 Pod. The network management system agent also reads this information from the configuration database and provides the information to the datapath so that the datapath has the ability to send data messages to the L7 Pod for service processing as needed.

The network management system also provides the service processing configuration for the L7 Pod to the configuration database on the L4 Pod in some embodiments. In some such embodiments, the L7 Pod also executes a database client that is configured to retrieve the service processing configuration for that pod in the L4 Pod configuration database. In some embodiments, the service processing configuration is the configuration for the specific L7 service (s) performed by the L7 Pod that are configured by the user (e.g., network administrator, security administrator, etc.) through the network management system. That is, this data specifies how TLS proxy should be performed, a specific L7 load balancing configuration, etc., depending on the type of service(s) performed by the L7 Pod. This configuration may include specific rules configured by the network administrator through the network management system (e.g., specific types of data messages to block, etc.). In some embodiments, if the L7 Pod performs security services (e.g., TLS proxy), any security keys needed are published to the L4 Pod (e.g., via a management plane agent that bypasses the configuration database). In some embodiments, the Pod configuration agent executing on the L4 Pod uses a Kubernetes secret scheme to provide these keys to the L7 Pod.

As mentioned, the network management system generates the service configuration for the L7 Pods. In some embodiments, when a network administrator defines a service for a logical router, the administrator (i) specifies that the service should be performed at the logical router and (ii) defines rules for the service to apply. The former (specification of the service) leads to the creation of one or more L7 Pods for the service within the cluster (as described above) while in many cases the latter causes the network management system to generate configuration rules for both the L4 Pod and the L7 Pods. That is, for a specific L7 service rule, the network management system generates (i) a redirection (policy-based routing) rule specifying when certain data messages need to be redirected by the L4 Pod to an L7 Pod for a specific service and (ii) the L7 processing rule for applying that L7 service rule.

For instance, a service rule will commonly indicate that specific types of traffic (e.g., http or https traffic meeting specific criteria) should be blocked if the traffic is sent from a particular source (or from any external source). In this case, the L4 Pod does not have the ability to inspect the L7 headers of a data message to determine whether that data message meets the specific criteria (the L4 Pod does not inspect L7 headers as this typically requires greater resource usage), so the network management system generates a redirection rule specifying that any data messages from the particular source (or all data messages received from external sources) are redirected to the L7 Pod performing the L7 service (or to any of these L7 Pods if more than one is instantiated).

Each time a service rule is configured at the network management system, the network management system generates the redirection rule (unless the redirection is covered by existing rules, in some embodiments) as well as the L7 service processing rule. The network management system, in some embodiments, assigns different spans to the two generated rules (i.e., L4 Pods for the redirection rule and L7 Pods for the specific service for the specific logical router for the L7 processing rule) and provides both of the rules to the configuration database at the L4 Pod. The network management system agent on the L4 Pod configures the policy-based routing rules at the datapath based on the redirection rule, while the database client at the L7 Pod detects (or is notified of) the update to the configuration database pertaining to its L7 Pod and retrieves the rule from the L4 Pod in order to configure the service application at the L7 Pod.

When a service is implemented by multiple L7 Pods, in some embodiments the datapath executing on the L4 Pod load balances between the Pods. When the datapath determines that a data message requires a particular L7 service implemented by multiple Pods, the datapath selects one of the L7 Pods that performs that service. In some embodiments, the load balancing (i.e., selection of one of the L7 Pods) is performed in such a way that all of the data messages for any given flow are forwarded to the same L7 Pod (e.g., using a deterministic algorithm, storing connection state, etc.). For instance, in some embodiments the datapath uses a hash function to choose between different L7 Pods. The network management system, in some embodiments, provides the configuration to the L4 Pod specifying the hash function to be used (e.g., the type of hash, which data message headers are hashed, etc.).

As noted, the network management system also configures inter-Pod connectivity (i.e., the connectivity between the L4 Pod and L7 Pods) in some embodiments. When forwarding a data message to an L7 Pod, the datapath at the L4 Pod uses an L2 connection that was setup between the L4 Pod and the L7 Pod. As described previously, in some embodiments the Pod configuration agent executing on the L4 Pod provides the L7 Pod with information for a new interface that is used for this connection between the L4 and L7 Pods. The datapath forwards data messages in need of L7 processing by a particular L7 Pod to this interface of the L7 Pod. In addition, after performing service processing on the data message, the L7 Pod sends the data message back to the L4 Pod for further processing (assuming that the data message is not blocked/dropped by the L7 Pod). The L4 Pod can then forward the data message to another L7 Pod (if additional service processing is required and the L7 services are split into different Pods) or to its next destination (e.g., out of the network, to a logical network endpoint, etc.).

The L2 construct via which the data messages are sent between the L4 Pod and an L7 Pod, in some embodiments, depends on the type of networking used in the container cluster as well as whether the L7 Pod is on the same node as the L4 Pod. In some embodiments, a virtual switch or set of virtual switches are used to connect the L4 Pod with an L7 Pod. For example, if the L4 Pod and the L7 Pod are executing on the same node (e.g., a virtual machine), some embodiments execute and configure an Open vSwitch (OVS) bridge to which both of these Pods connect. In this case, the datapath of the L4 Pod sends the data message (e.g., encapsulated with the interface address of the L7 Pod) onto the bridge, which delivers the data message to the interface of the L7 Pod. The L7 Pod processes the data message and returns the data message (e.g., encapsulated with the interface address of the L4 Pod) to the bridge, which delivers the processed data message to the interface of the L4 Pod.

On the other hand, if the L7 Pod executes on a different node (e.g., a different virtual machine) of the cluster from the L4 Pod, some embodiments execute and configure OVS bridges on both of the nodes. In this case, the bridges not only connect to the Pods on their respective nodes, but also each bridge is configured with a tunnel port (that, e.g., connects to a virtual tunnel endpoint (VTEP) of their respective nodes). To send a data message to the L7 Pod, the datapath of the L4 Pod sends the data message (e.g., encapsulated with the interface address of the L7 Pod) to the bridge on its node, which tunnels the data message to the corresponding bridge on the node with the L7 Pod (e.g., using a second layer of encapsulation). If the two nodes execute on the same host computer (e.g., on the same hypervisor), then the data message is tunneled via a virtual switch of the hypervisor. If the two nodes execute on different host computers, then the data message is tunneled via another underlay network.

The various virtual switches, in some embodiments, are configured based on instructions from the network management system. In this case, the network management system does not provide configuration data to the L4 Pod, as these virtual switches operate outside of the logical router Pods (in fact the virtual switches operate outside of the Pods entirely). In some embodiments, a container network interface (CNI) plugin executes on each of the nodes to configure the virtual switches (or other networking elements). The network management system provides configuration information describing the various switching rules (based on the interfaces configured for the L4 and L7 Pods) to a CNI agent on the relevant nodes in some embodiments. Through the CNI plugin, the virtual switches can then be instantiated and configured.

In some embodiments, the L4 Pod has separate interfaces, connecting to separate bridges executing on its node, for each L7 Pod to which the L4 Pod sends data messages for service processing. In other embodiments, a single bridge is used with one L4 Pod interface shared by data traffic to and from all of the L7 Pods. In some such embodiments, different VLANs are used (for different sub-interfaces) for traffic with each L7 Pod in order to differentiate the traffic.

Due to varying levels of traffic, in some embodiments the amount of resources in the container cluster devoted to the L4 Pods or to the L7 Pods for a specific service of a specific logical router may not be enough (or, conversely, may be more than are needed). To monitor the usage of the different groups of Pods, the network management system of some embodiments defines an orchestrator within the Kubernetes cluster (e.g., as part of the control plane). The orchestrator, in some embodiments, is a custom operator that communicates with both the Kubernetes control plane and the network management system.

The orchestrator monitors metrics (e.g., counters indicating a number of data messages processed, or other resource usage indicators) reported by the Pods to a time series database of the cluster. Based on these metrics, the orchestrator identifies when either (i) a group of Pods is overutilized and needs additional resources or (ii) a group of Pods is underutilized and can have the number of Pods in the group reduced. Upon making such a determination, the orchestrator notifies the network management system and, in some embodiments, the Kubernetes cluster control plane (e.g., the API server).

In some embodiments, the process is different when scaling the number of L7 Pods as compared to L4 Pods. When the orchestrator determines that an additional Pod should be instantiated for a group of L7 Pods performing a service for a logical router, the orchestrator notifies the network management system. In some embodiments, the network management system then initiates the process described above for instantiating and configuring a new L7 Pod (i.e., providing data to the L4 Pod(s) so that the Pod configuration agent can contact the Kubernetes control plane and provide configuration data to the L7 Pod). In some embodiments, the network management system defines the necessary interface on the L7 Pod for inter-Pod connectivity with the L4 Pod datapath and modifies the span of the service configuration data. The service configuration data, in some embodiments, is re-distributed to the configuration database at the L4 Pod with the updated span so that the L7 Pod (once instantiated) will retrieve the data. In addition, the network management system modifies the policy-based routing configuration for the datapath at the L4 Pod to include the new L7 Pod as one of the potential destinations for redirected data messages. This updated routing configuration is provided to the L4 Pod so that the network management system agent can update the datapath configuration.

Similarly, when the orchestrator determines that the number of L7 Pods should be reduced, the orchestrator notifies the network management system. Either the orchestrator directly or the network management system (via the Pod configuration agent in the L4 Pod) contacts the Kubernetes API server to delete the superfluous L7 Pod. In addition, the network management system modifies the span of the service configuration data and updates the redirection rule, this time to remove the deleted L7 Pod as an option for redirected data messages.

Scaling of the L4 Pods involves additional complexity in some embodiments. In some embodiments, the orchestrator directly commands the API server to instantiate another L4 Pod (while also notifying the network management system), while in other embodiments the orchestrator only notifies the network management system (which commands the API server to instantiate another L4 Pod). In either case, the network management system treats the scaling of the L4 Pod as addition of another uplink interface (or multiple interfaces) for the first-tier logical router (i.e., the addition of another member to a cluster of interfaces for connection with the external network). The network management system defines these new uplink interfaces (including assigning network addresses to the interfaces) based on pre-defined administrator configuration of the first-tier logical router and provides the configuration data (as well as the rest of the redirection and routing configuration) to the new L4 Pod. Whereas the scaling of an L7 Pod group affects the redirection rule configuration, scaling of the L4 Pod has no effect on these rules (i.e., the same rules are distributed to each of the L4 Pods, including the new L4 Pod). In this sense, the scaling of the L4 Pod can be viewed as the scaling of the first-tier logical router, with the second-tier logical router configurations all staying constant.

However, because new uplinks are defined, the connection with the external router(s) changes and needs to be accounted for. In some embodiments, the network management system provides routing protocol configuration to the L4 Pod (as described above for the initial L4 Pods). Ideally, the new L4 Pod should learn all of the routes from the external router(s) that have already been learned by the existing L4 Pods. In some embodiments, the network administrator configures the external router(s) with a range of neighbors that the external routers expect to initiate a connection and start a routing protocol session. As such, when the new interfaces are added, these are within the configured range for the external router so that a connection can be easily initiated and all of the routes learned from the external router without the need for any additional configuration of that external router.

Similarly, when the orchestrator determines that the number of L4 Pods should be reduced, the orchestrator notifies the network management system. The network management system deletes the uplink interfaces and notes that the uplink addresses can be re-used in the future (e.g., adds these back to a pool of available IP addresses). Either the orchestrator or network management system commands the API server to delete one of the L4 Pods. In some embodiments, the external router(s) will detect that the L4 Pod is no longer available and stop sending data messages to that Pod.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 15 conceptually illustrates a process of some embodiments for generating both a redirection rule for the L4 Pod datapath and an L7 service processing rule for the L7 Pod based on the specification of a rule for an L7 service of a logical router.

FIG. 19 conceptually illustrates a process of some embodiments for scaling a group of L7 Pods that implement a particular L7 service for a particular logical router.

FIG. 20 conceptually illustrates a process of some embodiments for scaling a group of L4 Pods that implement routing for a group of logical routers in a Kubernetes cluster.

DETAILED DESCRIPTION

Figure 1:
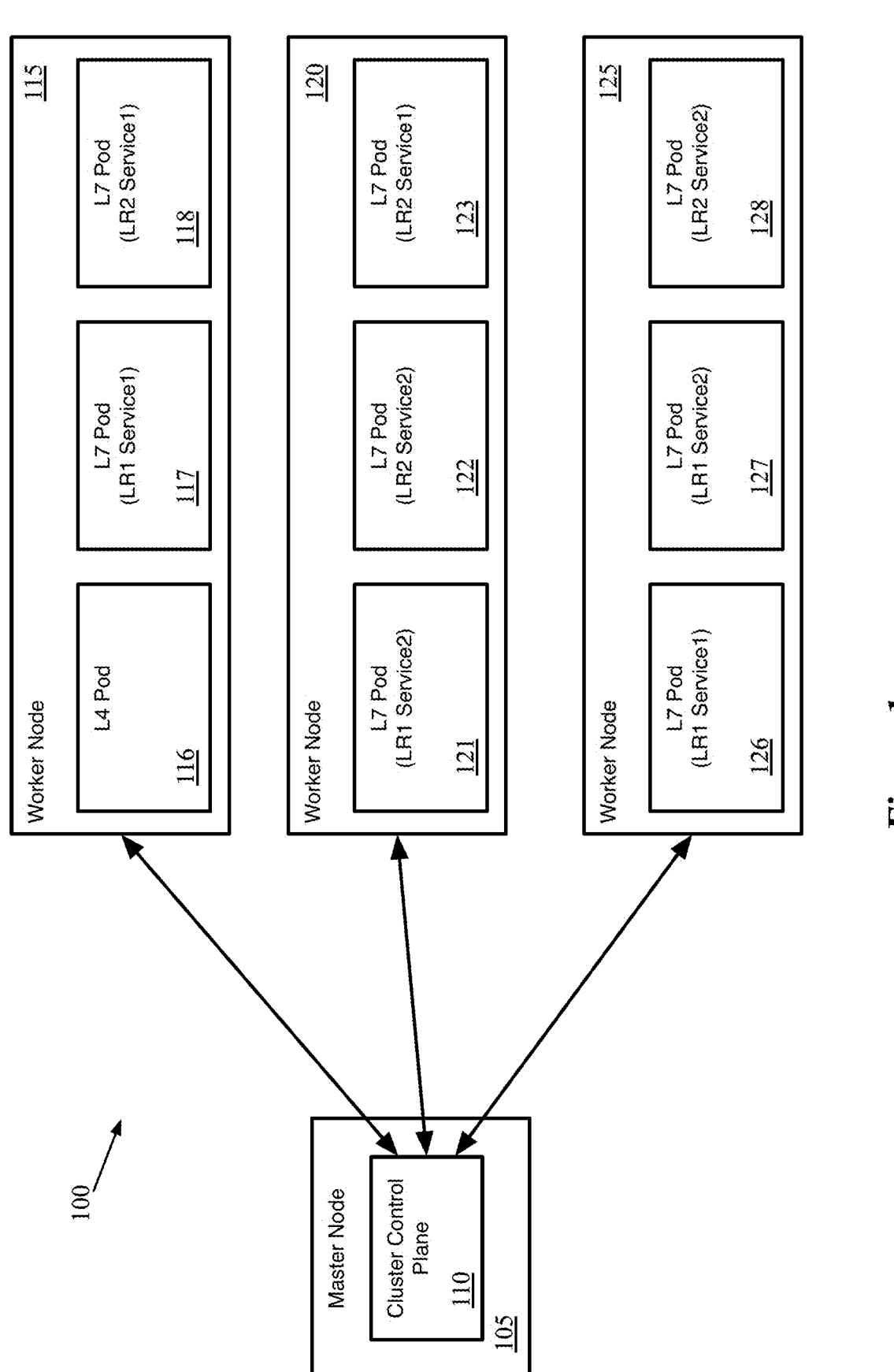
FIG. 1 conceptually illustrates an overview of a Kubernetes cluster of some embodiments in which a set of Pods implement multiple logical routers for a logical network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network management system for implementing a logical network, including one or more logical routers, in a container cluster (e.g., a Kubernetes cluster) having multiple nodes that each execute a set of Pods. In some embodiments, the network management system is external to the container cluster and maintains state of the logical network. In some embodiments, each of a set of the logical routers of a logical network performs layer 7 services (e.g., TLS proxy, load balancing service) on at least a subset of the logical network data traffic that the logical router processes. Each of these logical routers has its functionality divided across multiple Pods. Specifically, some embodiments deploy a first Pod (or set of Pods) that performs data forwarding operations (e.g., layer 2-layer 4 operations) for multiple logical routers as well as one or more separate Pods for each of these logical routers to perform services (e.g., layer 7 service operations) for its respective logical router.

The logical routers (along with the other elements of the logical network) are defined through the network management system in some embodiments, with this definition including a set of L7 services to be performed on at least a subset of data messages processed by the logical router. In some embodiments, the network management system defines at least a first logical router within the container cluster as two or more separate custom resource (CR) instances. Specifically, via the control plane of the container cluster (e.g., executing on a master node of the Kubernetes cluster), the network management system defines (i) a first CR instance that is associated with a first CR definition (CRD) for implementing logical forwarding for the logical router and (ii) separate CR instances associated with a second CRD for implementing each L7 service defined for the logical router. The cluster control plane defines a first set of Pods for the first CR instance and a separate set of Pods for each of the CR instances defined for L7 services. In other embodiments, the network management system defines a single CR instance for the L7 services of the logical router as a whole and a set of Pods is then defined by the cluster control plane for this CR instance.

In some embodiments, assuming a single Pod is defined to perform data forwarding operations for multiple logical routers (referred to herein as an "L4 Pod"), the cluster controllers assign this L4 Pod to a specific first node of the cluster and then distribute the Pods for performing L7 services of the logical router (referred to herein as "L7 Pods") across a set of worker nodes (possibly including the first node). Some embodiments affinitize the L4 Pod to the first node (i.e., so that this Pod is pinned to this node) while the L7 Pods may be moved between the nodes based on resource usage or other factors.

FIG. 1 conceptually illustrates an overview of a Kubernetes cluster 100 of some embodiments in which a set of Pods implement multiple logical routers for a logical network. As shown, the cluster 100 includes a master node 105 that executes a set of cluster control plane components 110 as well as a set of worker nodes 115, 120, and 125, each of which executes a respective set of Pods that collectively implement the set of logical routers. Specifically, the first worker node 115 executes an L4 Pod 116 and two L7 Pods 117 and 118. These L7 Pods 117 and 118 implement respective L7 services for two different logical routers. For both of these logical routers, the L4 Pod 116 implements logical forwarding (e.g., routing) operations as well as L4 operations (e.g., network address and/or port translation). The second worker node 120 executes three L7 Pods 121-123. The first of these Pods 121 implements a second L7 service for the first logical router, the second Pod 122 implements a second L7 service for the second logical router, and the third Pod 123 implements the first L7 service for the second logical router (allowing the L4 Pod to load balance between the Pod 118 and the Pod 123) for the provision of this L7 service. Finally, the third worker node also executes three L7 Pods 126-128. In this case, the first Pod 126 implements the first L7 service for the first logical router, the second Pod 127 implements the second L7 service for the first logical router, and the third Pod 128 implements the second L7 service for the second logical router.

Each logical router is configured (e.g., by a network administrator) to perform a respective set of services on data messages handled by that logical router. In this case, each of the two logical routers is configured to perform two different services on data messages processed by the respective logical routers. These services may be the same two services for each of the logical routers or different sets of services. The services, in some embodiments, include L5-L7 services, such as L7 firewall services, transport layer security (TLS) services (e.g., TLS proxy), L7 load balancing services, uniform resource locator (URL) filtering, http/https filtering, and domain name service (DNS) forwarding. As in this example, if multiple such services are configured for a given logical router, each of these services is implemented by a separate L7 Pod in some embodiments. In other embodiments, one L7 Pod performs all of the services configured for its logical router. Furthermore, some embodiments execute a single L7 Pod for each service (or for all of the services), while in other embodiments (as in this example) multiple L7 Pods execute for a service and the L4 Pod load balances traffic between the L7 Pods.

The master node 105, in some embodiments, includes various cluster control plane components 110 that control and manage the worker nodes 115, 120, and 125 of the cluster 100 (as well as any additional worker nodes in the cluster). In different embodiments, a cluster may include one master node or multiple master nodes, depending on the size of the cluster deployment. When multiple master nodes are included for a large cluster, these master nodes provide high-availability solutions for the cluster. The cluster control plane components 110, in some embodiments, include a Kubernetes application programming interface (API) server via which various Kubernetes constructs (Pods, custom resource definitions and instances of those custom resources, etc.) are defined for the cluster, a set of controllers to run the cluster, a state database for the cluster (e.g., etcd), and a scheduler for scheduling Pods across the worker nodes and for scheduling functionalities for worker nodes in the cluster. In different embodiments, the master node 105 may execute on the same host computer as some or all of the worker nodes of the cluster or on a separate host computer from the worker nodes.

Figure 2:
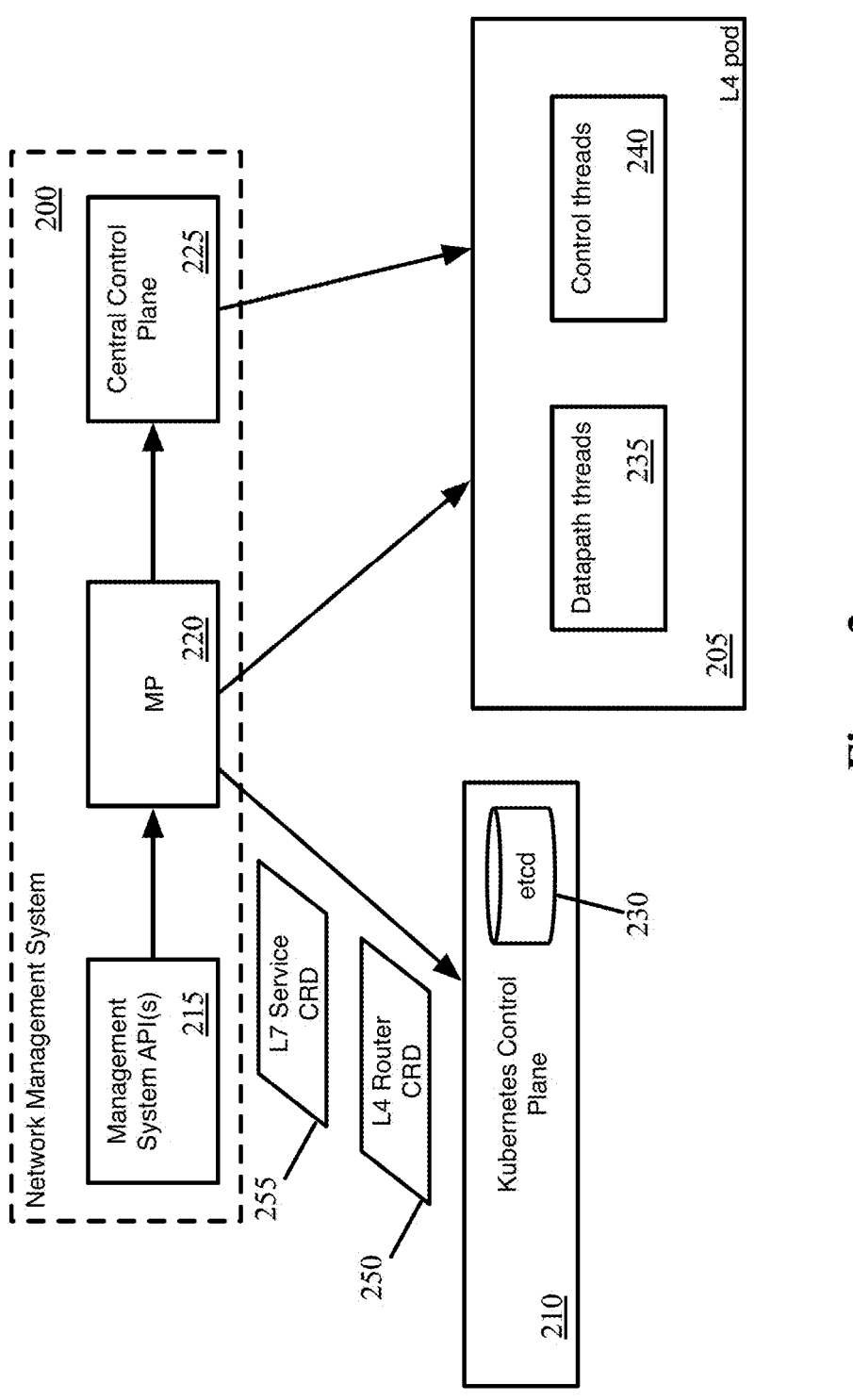
FIG. 2 conceptually illustrates a network management system that provides network configuration information to an L4 Pod as well as to the Kubernetes control plane.

In some embodiments, the logical router (and additional logical network elements and policies implemented in the cluster) is managed by an external network management system. FIG. 2 conceptually illustrates a network management system 200 that provides network configuration information to an L4 Pod 205 as well as to the Kubernetes control plane 210. The network management system 200 includes a set of management system APIs 215, a management plane 220, and a central control plane 225. In some embodiments, the network management system is implemented outside of the Kubernetes cluster or (at least partially) in a separate Kubernetes cluster. For instance, the network management system 200 might reside in an enterprise datacenter and manage both one or more physical datacenters as well as the Kubernetes cluster in which the logical routers are implemented (which might be implemented in the physical enterprise datacenter or in a public cloud datacenter).

The management system APIs 215 are the interface through which a network administrator defines a logical network and its policies. This includes the configuration of the logical forwarding rules and the L7 services for the logical routers implemented within the Kubernetes cluster. The administrator (or other user) can specify, for each logical router, which L7 services should be performed by the logical router, on which data messages processed by the logical router each of these L7 services should be performed, and specific configurations for each L7 service (e.g., how L7 load balancing should be performed, URL filtering rules, etc.). For certain logical routers, the network administrator may also specify interfaces for connection to external networks (e.g., logical networks at other datacenters, the public Internet, etc.).

The management plane 220 receives the logical network definition and policies input through the APIs 215 and generates logical network configuration data to be provided to various network elements (including the L4 and L7 Pods) that implement the logical network. The management plane 220, in some embodiments, communicates with both the Kubernetes cluster control plane 210 and the L4 Pod 205 (or multiple L4 Pods in case there is more than one L4 Pod in the cluster). The management plane provides certain logical network configuration data directly to the L4 Pods. In some embodiments, the management plane 220 is also responsible for managing life cycles for at least some of the Pods (e.g., the L4 Pods) via the Kubernetes control plane 210.

The Kubernetes control plane 210, as described above, includes a cluster state database 230 (e.g., etcd), as well as an API server (not shown in this figure). The API server, in some embodiments, is a frontend for the Kubernetes cluster that allows for the creation of various Kubernetes resources. In some embodiments, in order to add a new Pod to the cluster, either the management plane 220 or another entity (e.g., an agent executing on the L4 Pod 205) interacts with the Kubernetes control plane to create this Pod.

In some embodiments, as shown, the management plane 220 defines custom resources with the Kubernetes control plane 210 (e.g., via the API server). Specifically, some embodiments specify a L4 logical router custom resource definition (CRD) 250 and a L7 service CRD 255. These CRDs define attributes of custom-specified network resources, extending the types of resources that are available in the Kubernetes cluster. Specifically, the L4 logical router CRD 250 defines the L4 Pod (or group of Pods) as a custom resource, while the L7 service CRD 255 defines a group of L7 Pods as a custom resource. As described further below, in some embodiments the management plane 220 also defines instances of these custom resources (e.g., one L4 logical router custom resource instances and multiple L7 service custom resources instances.

The management plane 220 also provides various logical network configuration data (e.g., forwarding and service policies) to the central control plane 225. The central control plane 225, in some embodiments, provides this information directly to the Pods. To identify to which Pods each piece of configuration data should be distributed, the central control plane 225 assigns a span to each piece of configuration data. For instance, logical routing configuration for each logical router spans the set of L4 Pods while L7 service rules for a given logical router span the L7 Pods implementing that service for the logical router (although, as described below, these rules are distributed to the L4 Pod in some embodiments for retrieval by the appropriate L7 Pods).

In some embodiments, various agents execute on the nodes and/or Pods to receive configuration information from the central control plane 225 and/or the management plane 220 and configure entities (e.g., forwarding elements, services, etc.) on the Pods (or in the nodes for inter-Pod communication) based on this configuration information. For instance, as described below, logical router configuration is provided to the L4 Pod by the central control plane 225.

The L4 Pod 205, as shown, executes both datapath threads 235 and control threads 240. In some embodiments, the L4 Pod 205 executes a data plane development kit (DPDK) datapath that uses a set of run-to-completion threads (the datapath threads 235) for processing data messages sent to the logical router as well as a set of control threads 240 for handling control plane operations. Each datapath thread 235, in some embodiments, is assigned (i.e., pinned) to a different core of a set of cores of a computing device on which the first Pod executes, while the set of control threads 240 are scheduled at runtime between the cores of the computing device. The set of data message processing operations performed by the L4 pod (e.g., by the datapath threads 235) includes L2-L4 operations, such as L2/L3 lookups, tunnel termination/encapsulation, L2-L4 firewall processing, packet updating, and byte counters. The operation of the L4 Pods will be described in further detail below.

Figure 3:
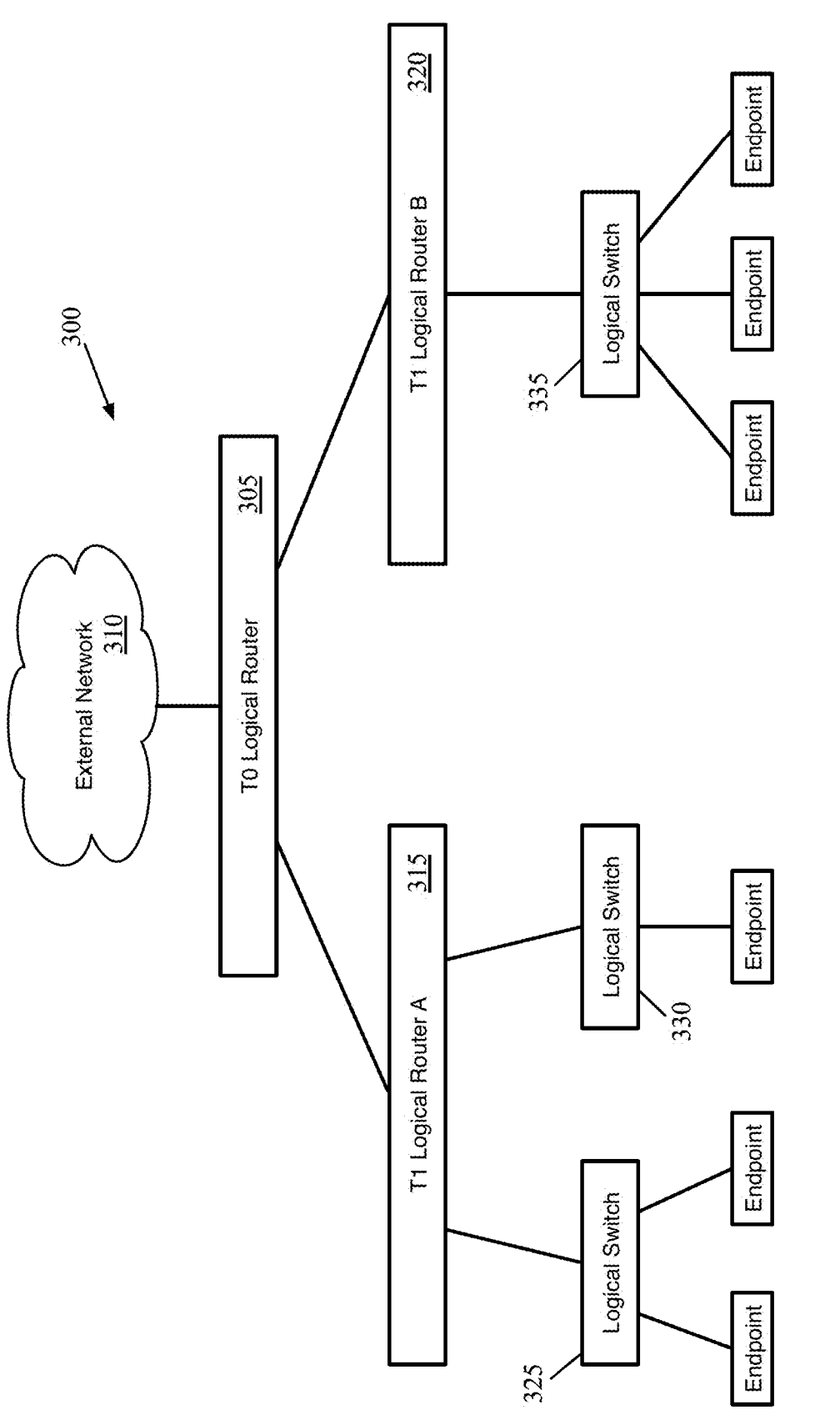
FIG. 3 conceptually illustrates a logical network of some embodiments.

As mentioned, in some embodiments, the logical routers belong to a logical network. This logical network connects network endpoints (e.g., various applications), which may also execute on Pods of the cluster, to each other as well as to external endpoints. FIG. 3 conceptually illustrates such a logical network 300. As shown, the logical network includes a T0 logical router 305 that connects the logical network 300 to an external network 310, two T1 logical routers 315 and 320, and three logical switches 325-335 to which various network endpoints connect.

The T0 logical router 305, in some embodiments, is a logical router of a first type (first tier) that interfaces with external networks and includes both centralized and distributed components. The T0 logical router 305 handles all traffic entering and exiting the logical network 300 and exchanges routes (e.g., using BGP or another routing protocol) with the external network 310. The T1 logical routers 315 and 320 connect groups of logical switches and provide administrator-configured services (e.g., L7 services) for data traffic sent to and from these logical switches. When one endpoint connected to a particular logical switch sends data traffic to another endpoint connected to that particular logical switch, no logical router processing is performed and therefore no L7 services need to be applied to the data traffic. However, when traffic is exchanged between such a logical network endpoint to an endpoint connected to another logical switch (or external to the logical network), L7 services configured for any of the logical routers between those network endpoints are applied to the data traffic. Thus, if a network endpoint connected to the first logical switch 325 sends traffic to the network endpoint connected to the second logical switch 330 (or to an external endpoint), L7 services configured for the first logical router 315 are applied to this traffic. If the same network endpoint sends traffic to a network endpoint connected to the third logical switch 335, then L7 services configured for both the first logical router 315 and the second logical router 320 are applied to the traffic.

In some embodiments, the logical network 300 is implemented in a distributed manner, either in the Kubernetes cluster in which the logical routers are implemented, another datacenter (or separate cluster in the same datacenter as the logical routers) in which the network endpoints reside, or a combination thereof. In some embodiments, the network endpoints reside in the same Kubernetes cluster (and at least partially on the same nodes) as the logical routers. In this case, the logical switches and, in some cases, distributed components of the logical routers, are implemented by various software networking mechanisms that execute on the network endpoint Pods, the logical router Pods, the nodes on which these Pods reside (i.e., the networking constructs outside of the Pods), or a combination thereof.

Figure 4:
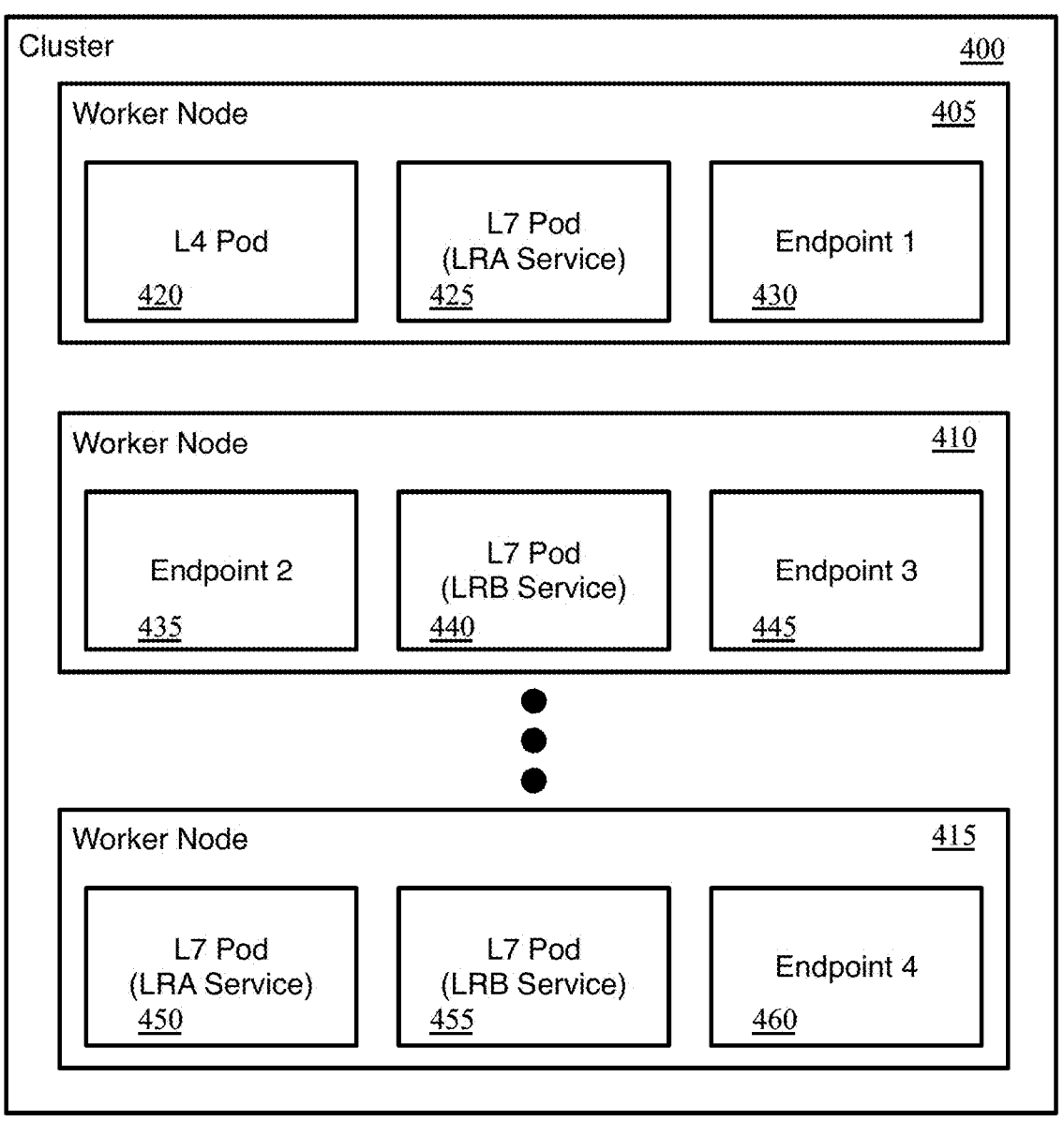
FIG. 4 conceptually illustrates a Kubernetes cluster within which the logical network of FIG. 3 is implemented.

FIG. 4 conceptually illustrates a Kubernetes cluster 400 within which the logical network 300 is implemented. This figure, it should be noted, does not include various aspects of the cluster, such as the control plane, ingress processing, etc. As shown, the cluster 400 includes multiple worker nodes 405-415 on which various Pods execute. The first worker node 405 executes an L4 Pod 420 that implements the forwarding aspects of the logical routers 305, 315, and 320, an L7 Pod 425 that implements the L7 services of the first T1 logical router 315, and one of the network endpoints 430. The second worker node 410 executes two network endpoints 435 and 445 as well as an L7 Pod 440 that implements the L7 services of the second T1 logical router 320. The third worker node 415 executes one network endpoint 460 as well as two L7 Pods 450 and 455 that respectively implement the L7 services of the first and second T1 logical routers 315 and 320. Other worker nodes may execute additional network endpoints, additional L7 Pods for the T1 logical routers (or for the T0 logical router 305), etc.

Figure 5:
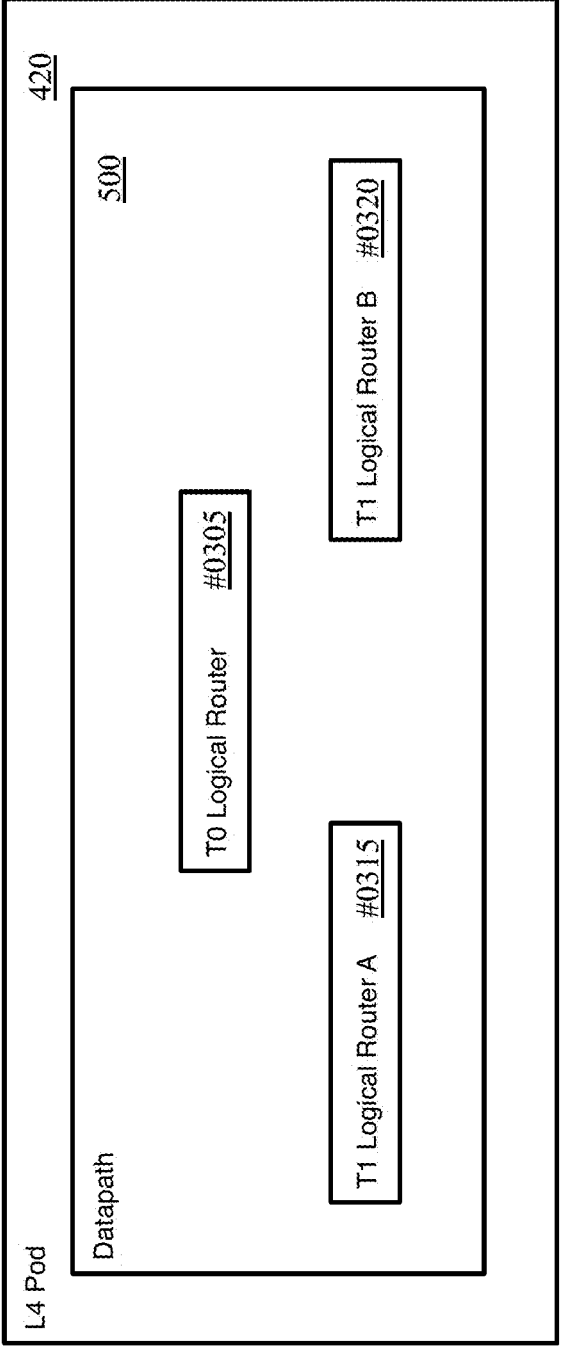
FIG. 5 conceptually illustrates additional detail regarding the L4 Pod shown in FIG. 4 according to some embodiments.

FIG. 5 conceptually illustrates additional detail regarding the L4 Pod 420 according to some embodiments. Specifically, the L4 Pod 420 executes a datapath 500 that implements all of the logical routers 305, 315, and 320. As described further below, for data traffic entering the logical network, the datapath 500 implements the configuration for the T0 logical router 305 and the configuration for one of the logical routers 315 or 320. Conversely, for data traffic exiting the logical network, the datapath 500 implements the configuration for one of the logical routers 315 or 320 and then the configuration for the T0 logical router 305. In general, each L4 Pod implements (i) a single first-tier logical router as well as (ii) any number of second-tier logical routers (i.e., all of the logical routers defined to connect to that first-tier logical router).

Figure 6:
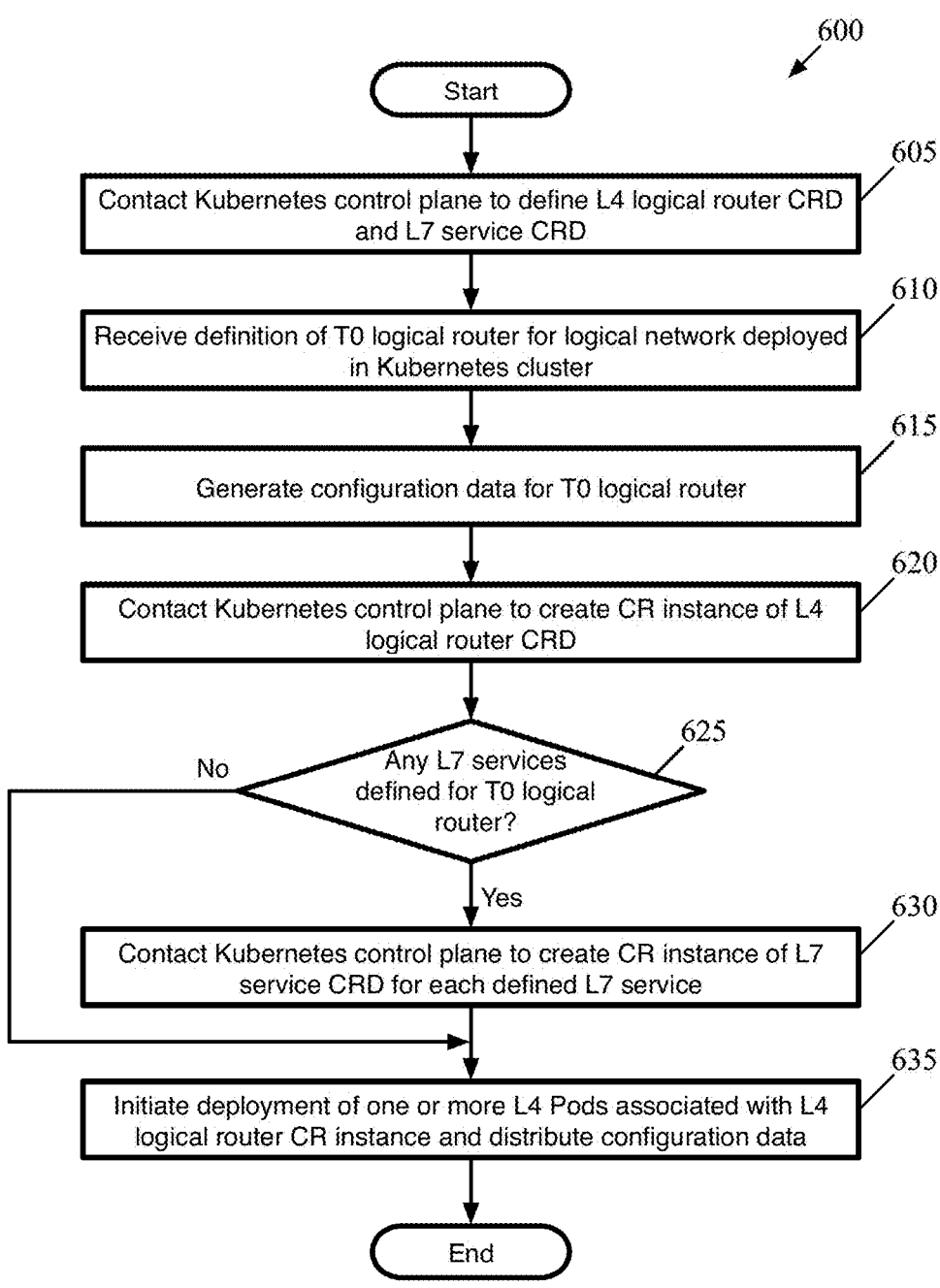
FIG. 6 conceptually illustrates a process of some embodiments for defining custom resources for a newly defined T0 logical router.

FIG. 6 conceptually illustrates a process 600 of some embodiments for defining custom resources for a newly defined T0 logical router. In some embodiments, the process 600 is performed by the management plane of a network management system that manages a logical network implemented in a Kubernetes cluster (e.g., the network management system shown in FIG. 2). It should be noted that the process 600 is a conceptual process, and that (i) the operations shown in this process may not occur in the exact order shown and (ii) the process may not include some of the operations or include other operations not shown in the figure in various embodiments.

As shown, the process 600 begins by contacting (at 605) the Kubernetes control plane to define an L4 logical router CRD and an L7 service CRD. In some embodiments, this operation is performed at the time of initial deployment of the network management system or upon connection of the network management system to the Kubernetes control plane (e.g., when the network management system is initially configured to contact the network management system). In other embodiments, the operation to define the CRDs occurs only after the first T0 logical router is defined within the network management system (i.e., once it is determined that the L4 and L7 Pods will be needed to implement logical routers). As indicated above, the CRDs define attributes of custom-specified network resources, extending the types of resources that are available in the Kubernetes cluster. Specifically, the L4 logical router CRD defines the L4 Pod (or group of Pods) as a custom resource (with certain properties, such as direct external connectivity and auto-scaling), while the L7 service CRD defines a group of L7 Pods as a custom resource (with certain properties, such as auto-scaling).

The process 600 receives (at 610) a definition of a T0 logical router for a logical network deployment in the Kubernetes cluster. In many cases, the network management system receives this logical router definition through its API (e.g., from a network administrator) during the initial setup of the logical network, as the T0 logical router is specified in order to connect the logical network to any external networks. The logical router definition, in some embodiments, specifies uplink interfaces for the logical router as well as the external networks to which those uplinks connect. These external networks may include the public Internet, private VPNs (e.g., to connect to other datacenters for the same entity, etc.). In some embodiments, one T0 logical router may include separate uplink interfaces for connection to both the public Internet as well as one or more private networks. In some embodiments, the user specifies the uplink interfaces as interface groups. The number of L4 Pods that will be deployed at a given time is unknown (as described in more detail below, the Kubernetes cluster may auto-scale the number of L4 Pod), so the user specifies characteristics of one or more uplink interfaces that will be configured for each L4 Pod. Each uplink interface group is defined to have equivalent external connectivity for any uplink in the group (i.e., will connect to the same external router in the same manner). In some embodiments, the user also specifies connectivity information for each uplink group (e.g., network address range, etc.).

In some embodiments, the user may also specify various services to be performed as part of the T0 logical router configuration. Any services specified for the T0 logical router have the potential to be applied to all data traffic entering and/or exiting the logical network (unlike services configured for T1 logical routers, which only apply to subsets of traffic processed by those specific T1 logical routers). The specified services can include L2-L4 services (e.g., network address and/or port translation (NAPT), L4 load balancing, etc.) as well as L5-L7 services (e.g., TLS proxy, L7 load balancing, URL filtering, http filtering, etc.).

Next, the process 600 generates (at 615) configuration data for the T0 logical router. As described above, in some embodiments the management plane generates configuration data for logical network elements based on the definitions of those logical elements. In some embodiments, the configuration data for the T0 logical router includes the initial configuration of routing tables as well as the configuration of service rules for any configured services. As described in more detail below, if L7 services are configured, some embodiments configured both policy-based routing rules (for redirection) as well as service rules.

The process 600 also contacts (at 620) the Kubernetes control plane to create a CR instance of the L4 logical router CRD (i.e., one of the CRDs that was previously defined by the management plane through the Kubernetes control plane). In some embodiments, the management plane defines a single CR instance of the L4 logical router CRD for each T0 logical router. Thus, for a typical logical network with a single T0 logical router defined (i.e., so that the T0 logical router is the single logical point of ingress and egress for the network), the management plane defines the L4 logical router CR instance upon definition of that T0 logical router. In some embodiments, any subsequently configured T1 logical routers that connect to the T0 logical router are associated with this initial CR instance. In some embodiments, the initial definition of the CR instance causes the Kubernetes control plane to deploy one or more L4 Pods. In other embodiments, however, the Pod creation is a separate interaction with the control plane.

Next, the process 600 determines (at 625) whether any L7 services are defined for the T0 logical router. Some embodiments only allow the specification of L7 services for T1 logical routers, in which case this operation is skipped. However, other embodiments allow for the network administrator to define L7 services as part of the T0 logical router configuration.

In the latter case, if any L7 services are specified, the process contacts (at 630) the Kubernetes control plane to create a CR instance of the L7 service CRD (i.e., one of the CRDs that was previously defined by the management plane through the Kubernetes control plane) for each such service. Whereas a single L4 logical router CR instance is defined for all of the logical routers, some embodiments define numerous instances of the L7 service CRD, with each such service having a separately defined CR instance in some embodiments. Some embodiments define separate CR instances for each individual L7 service (e.g., if TLS proxy and L7 load balancing are configured for a logical router, two separate CR instances are defined), while other embodiments define one CR instance for a logical router irrespective of the number of different L7 services configured (i.e., if one L7 Pod for a logical router performs multiple L7 services).

Finally, the process 600 initiates (at 635) deployment of one or more L4 Pods associated with the L4 logical router CR instance and distributes configuration data to each of the L4 Pods once those Pods are deployed. The process 600 then ends. As noted, in some embodiments the command to deploy the Pods is separate from the command to create the CR instance. In addition, it should be noted that the deployment of any L7 Pods occurs in a separate process that is handled by an agent operating on the L4 Pod in some embodiments.

To initially deploy an L4 Pod (or multiple Pods) in some embodiments, the management plane generates a Pod specification for the L4 Pod. The Pod specification may specify a container image to use, the allocated memory and/or CPU, initialization scripts, and security policies for the Pod. In some embodiments, the container image specifies the applications to be executed in the Pod, including the datapath as well as a set of network management system components (e.g., a configuration database and a set of agents). This specification data is passed to the Kubernetes API server (or other components in the control plane), which initiates action on the Kubernetes back-end to create the Pod on a particular node of the cluster (typically the node is selected by the Kubernetes scheduling controller). In some embodiments, the specification for the L4 Pod also indicates a physical connectivity requirement. That is, the L4 Pod has a requirement that it have direct access (possibly through ingress mechanisms of the container cluster) to a set of one or more external physical routers. Once the L4 Pod has been deployed, the network management system can provide configuration data to the Pod.

Figure 7:
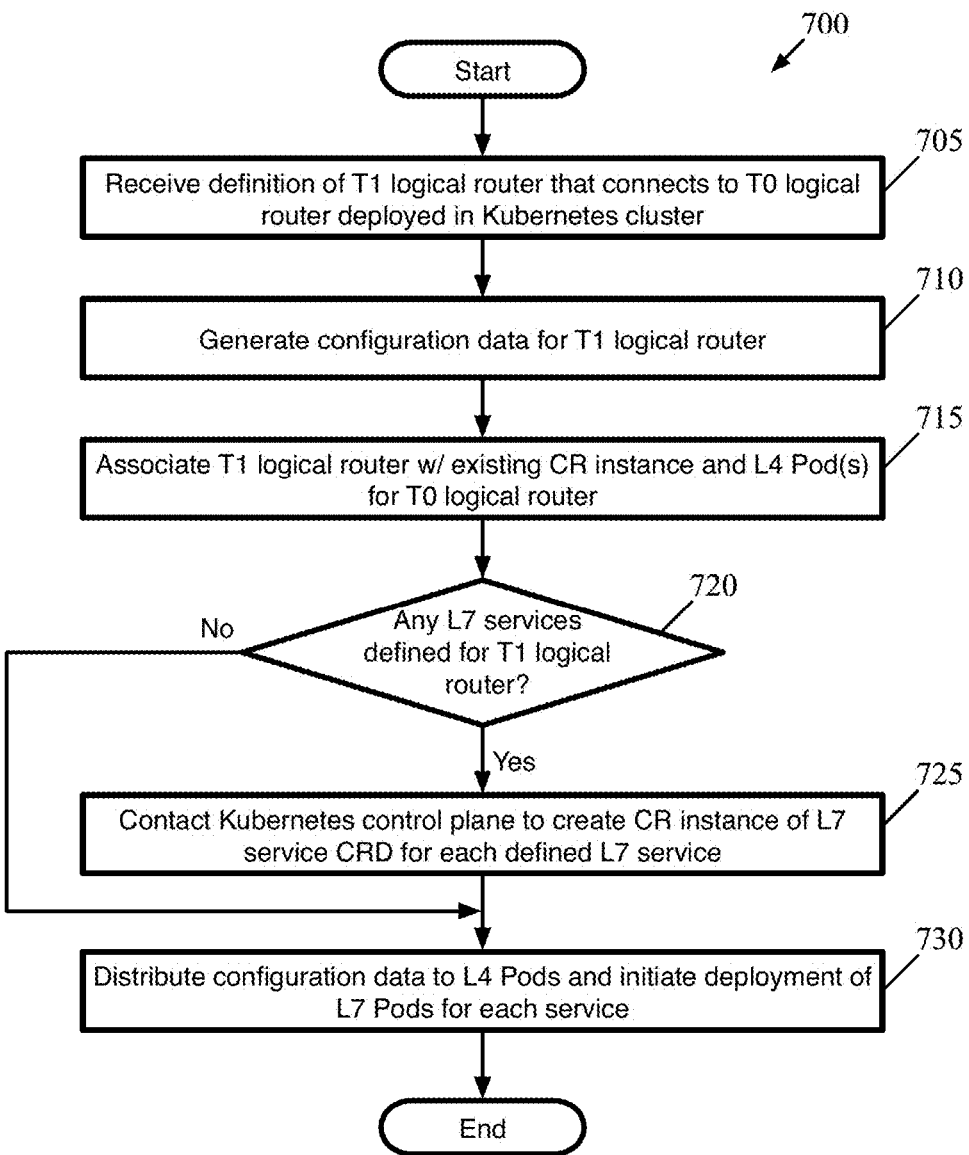
FIG. 7 conceptually illustrates a process of some embodiments for defining CR instances for a newly defined T1 logical router.

FIG. 7 conceptually illustrates a process 700 of some embodiments for defining CR instances for a newly defined T1 logical router. In some embodiments, the process 700 is performed by the management plane of a network management system that manages a logical network implemented in a Kubernetes cluster (e.g., the network management system shown in FIG. 2). It should be noted that the process 700 is a conceptual process, and that (i) the operations shown in this process may not occur in the exact order shown and (ii) the process may not include some of the operations or include other operations not shown in the figure in various embodiments.

As shown, the process 700 begins receiving (at 705) a definition of a T1 logical router that connects to a T0 logical router deployed in a Kubernetes cluster. In many cases, the network management system receives this logical router definition through its API (e.g., from a network administrator) during the initial setup of the logical network. However, T1 logical routers may also be created later, after the network has been deployed and running for a period of time. For instance, a user might want to deploy a new application in the Kubernetes cluster and define a T1 logical router along with one or more logical switches connected to the logical router and to which the network endpoints implementing that application connect. The logical router definition, in some embodiments, specifies an uplink interface via which the T1 logical router connects to the T0 logical router. In some embodiments, T1 logical routers do not connect directly to external networks but instead connect via a T0 logical router (thus ensuring that the T0 logical router handles all of the ingress and egress traffic). In some embodiments, the user may also specify various services to be performed as part of the T1 logical router configuration. Any services specified for the T1 logical router have the potential to be applied to traffic sent between the logical network endpoints located behind that T1 logical router and (i) external network endpoints or (ii) logical network endpoints located behind a different T1 logical router. The specified services can include L2-L4 services (e.g., network address and/or port translation (NAPT), L4 load balancing, etc.) as well as L5-L7 services (e.g., TLS proxy, L7 load balancing, URL filtering, http filtering, etc.).

Next, the process 700 generates (at 710) configuration data for the T1 logical router. As described above, in some embodiments the management plane generates configuration data for logical network elements based on the definitions of those logical elements. In some embodiments, the configuration data for the T1 logical router includes the initial configuration of routing tables as well as the configuration of service rules for any configured services. As described in more detail below, if L7 services are configured, some embodiments configured both policy-based routing rules (for redirection) as well as service rules.

The process 700 also associates (at 715) the T1 logical router with the existing L4 logical router CR instance and the L4 Pod(s) for the T0 logical router. In some embodiments, this association is internal to the management plane (i.e., the Kubernetes control plane does not need to be notified). However, for the management plane (and central control plane) of the network management system, identifying the Pods that will implement the T1 logical router is important. As noted previously, once the L4 Pods are deployed for a T0 logical router, any T1 logical routers that connect to that T0 logical router are also implemented by that same L4 Pod (and associated with the same L4 logical router CR instance).

Next, the process 700 determines (at 720) whether any L7 services are defined for the T1 logical router. If any L7 services are specified, the process contacts (at 725) the Kubernetes control plane to create a CR instance of the L7 service CRD (i.e., one of the CRDs that was previously defined by the management plane through the Kubernetes control plane) for each such service. Whereas a single L4 logical router CR instance is defined for all of the logical routers, some embodiments define numerous instances of the L7 service CRD, with each such service having a separately defined CR instance in some embodiments. Some embodiments define separate CR instances for each individual L7 service (e.g., if TLS proxy and L7 load balancing are configured for a logical router, two separate CR instances are defined), while other embodiments define one CR instance for a logical router irrespective of the number of different L7 services configured (i.e., if one L7 Pod for a logical router performs multiple L7 services).

Finally, the process 700 distributes (at 730) configuration data for the T1 logical router to the existing L4 Pod(s) and initiates deployment of one or more L7 Pods for each L7 service. As described below, in some embodiments the configuration data for both the L4 Pod and any associated L7 Pods is provided to the configuration database at the L4 Pod. An agent executing on the L4 Pod then initiates deployment of the L7 Pods based on specification of the services defined for the logical router.

In some embodiments, the specification for the L4 Pod (i.e., that is provided to the Kubernetes API server) also indicates a physical connectivity requirement. That is, the L4 Pod has a requirement that it have direct access (possibly through ingress mechanisms of the container cluster) to a set of one or more external physical routers. Depending on the applications executing on logical network endpoints, the external physical routers may provide connection to the public Internet and/or to a private connection to other datacenters (e.g., an enterprise datacenter). As such, the container cluster is required to assign the L4 Pod (which, as noted above is affinitized to a specific worker node) to a node that provides this connectivity.

Figure 8:
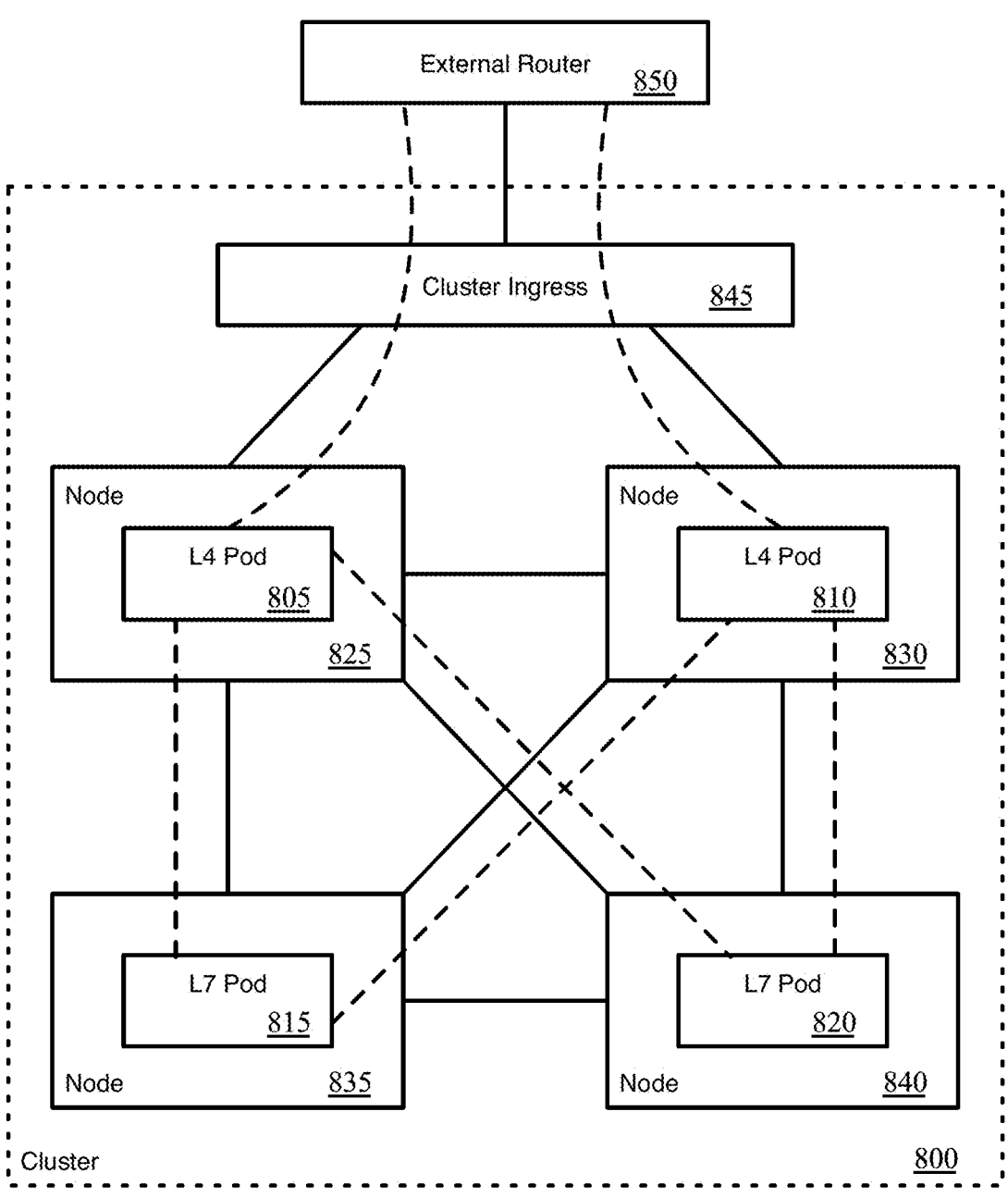
FIG. 8 conceptually illustrates a container cluster with two L4 Pods and two L7 Pods deployed on four nodes, showing connectivity between the nodes and communication between the Pods.

FIG. 8 conceptually illustrates a container cluster 800 with two L4 Pods 805-810 and two L7 Pods 815-820 deployed on four nodes 825-840, showing connectivity between the nodes 825-840 and communication between the Pods 805-820. In this example, the two L4 Pods 805 and 810 execute on nodes 825 and 830 that have a physical connection to a cluster ingress 845. The cluster ingress 845, in some embodiments, manages external access to the cluster 800. That is, the ingress 845 is transparent to the logical network but handles the traffic entering the cluster 800. In addition, all of the nodes 825-840 have physical connectivity to each other through the networking of the Kubernetes cluster 100.

Only the L4 Pods 805 and 810, residing respectively on the nodes 825 and 830, have connectivity to the external router 850 (via the cluster ingress 845). Each of the L4 Pods 805 and 810 implements one or more uplink interfaces of the T0 logical router, which are configured to connect to the external router 850 in some embodiments. In addition, each of the L4 Pods 805 and 810 has logical connectivity to each of the L7 Pods 815 and 820. The L7 Pods 815 and 820 generally do not need to communicate with each other. In this figure, the L4 Pods 805 and 810 are also shown as not communicating with each other. In some embodiments, however, the L4 Pods do have connectivity in order to, e.g., share routes with each other.

As noted, once the L4 Pod is deployed, the network management system provides logical router configuration to the L4 Pod. Specifically, in some embodiments a central control plane of the network management system determines that the span of each logical router implemented by the L4 Pod includes that Pod and therefore distributes the logical routing configuration to a configuration database (e.g., NestDB) stored on the L4 Pod. A network management system agent that executes on the L4 Pod identifies the logical routing configuration data in this database and uses the configuration data to configure the datapath executing on the L4 Pod. This logical routing configuration data, in some embodiments, includes configuration for both the T0 logical router as well as any T1 logical routers defined for the logical network and implemented by the L4 Pod.

Figure 9:
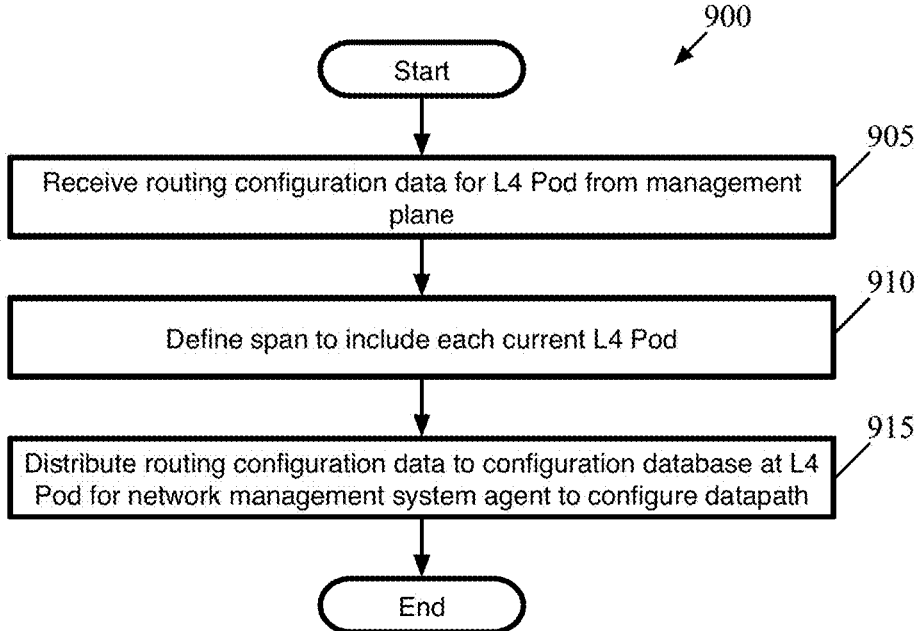
FIG. 9 conceptually illustrates a process of some embodiments for configuring the L4 Pods implementing a set of logical routers in a Kubernetes cluster.

FIG. 9 conceptually illustrates a process 900 of some embodiments for configuring the L4 Pods implementing a set of logical routers in a Kubernetes cluster. The process 900 is performed by a central control plane of a network management system that is external to the cluster in some embodiments. The process 900 is performed during initial configuration of the T0 logical router as well as each time a user of the network management system modifies the T0 logical router configuration or makes any changes to the T1 logical router configuration (modifications to existing T1 logical router configurations, additions of new T1 logical routers, deletion of existing T1 logical routers).

As shown, the process 900 begins by receiving (at 905) routing configuration data for the L4 Pod from the management plane. This routing configuration data, in some embodiments, specifies routing rules for the L4 Pods to implement. The routing configuration data may include static routes configured at the network management system, connected routes based on the configuration of logical switches and connection of those logical switches to T1 logical routers (or directly to the T0 logical router), redirection rules for redirecting traffic to L7 services, etc.

Next, the process 900 defines (at 910) the span of the routing configuration data to include each of the current L4 Pods. In some embodiments, the central control plane of the network management system uses the span to determine to which forwarding elements each piece of configuration data should be distributed. Thus, configuration data for distributed logical routers and/or logical switches may need to be sent to many Pods and/or nodes of the Kubernetes cluster that implement those logical network elements. The configuration data for the centralized routers (e.g., the T0 logical router, the centralized aspects of the T1 logical router), on the other hand, are only sent to the L4 Pods in some embodiments.

Based on the defined span, the process 900 distributes (at 915) the routing configuration data to the configuration database at each of the L4 Pods. In some embodiments, network management system agents executing on the L4 Pods use this data to configure the datapaths on each of the L4 Pods to implement the T0 and T1 logical routers according to the specified routing configuration.

Figure 10:
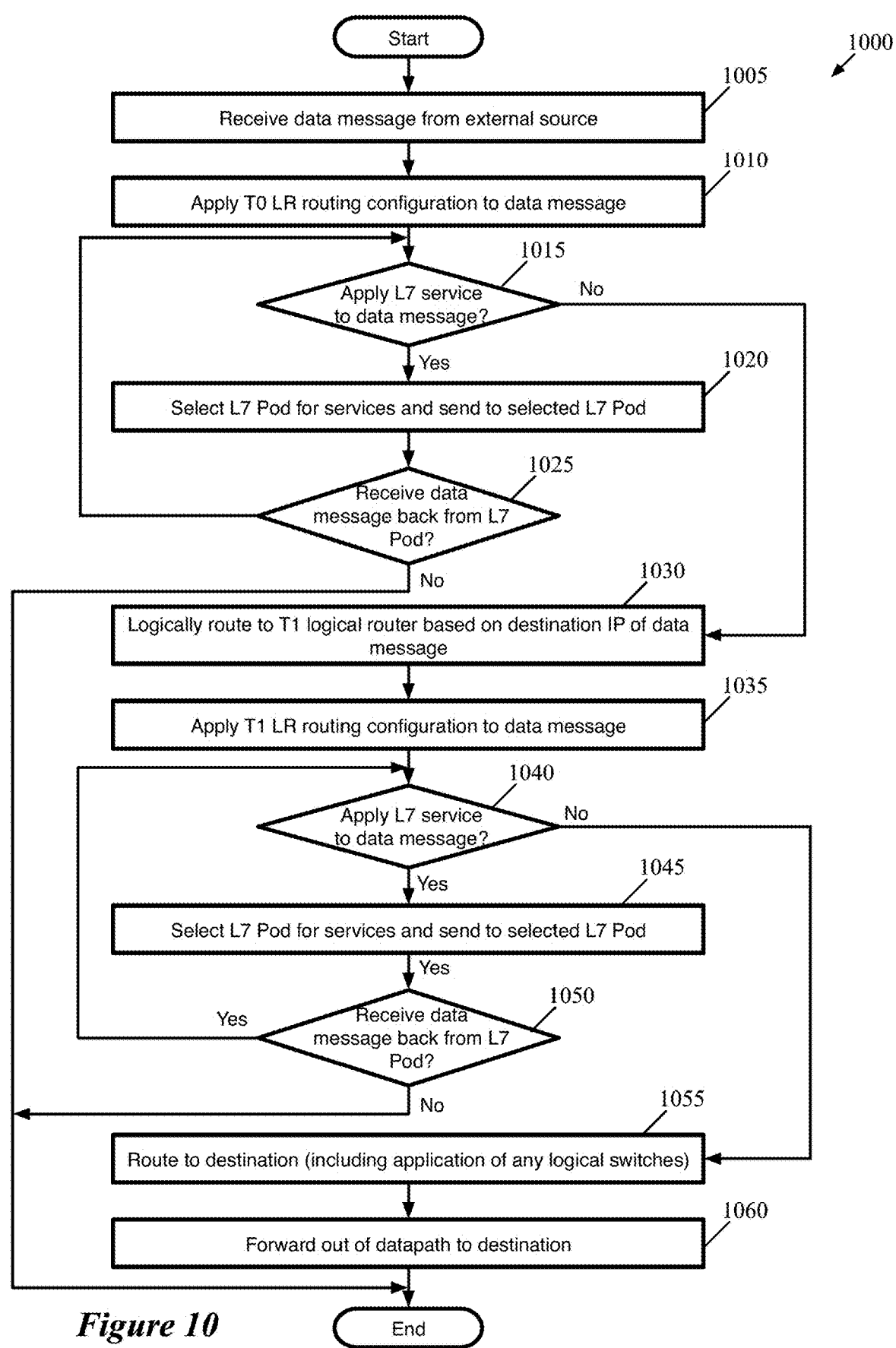
FIG. 10 conceptually illustrates a process of some embodiments for processing an incoming data message at an L4 Pod.

The network management system agent configures the datapath to handle both incoming and outgoing data traffic in some embodiments. FIG. 10 conceptually illustrates a process 1000 of some embodiments for processing an incoming data message at an L4 Pod (e.g., at the L4 Pod datapath). This process 1000, it should be noted, applies specifically to data messages that are received from an external network and processed by both a T0 logical router and a T1 logical router (e.g., as opposed to data messages directed to network endpoints attached to a logical switch connected directly to the T0 logical router).

As shown, the process 1000 begins by receiving (at 1005) a data message from an external source. In some embodiments, this data message is received from an external router (i.e., outside of the logical network) to which the L4 Pod connects. The external router routes the data message to the T0 logical router uplink implemented by the L4 Pod datapath based on the destination address of the data message. In some embodiments, the L4 Pod includes multiple interfaces with different network (e.g., IP) addresses, at least one of which corresponds to an uplink interface of the T0 logical router.

The process 1000 applies (at 1010) the T0 logical router routing configuration to the data message. In some embodiments, the datapath stores configurations (e.g., routing tables) for each logical router that it implements and retrieves the configuration for a particular router to apply the configuration for that particular router to a data message. Based on the data message being received at the uplink interface, the datapath applies the T0 logical router configuration.

Next, the process 1000 determines (at 1015) whether to apply an L7 service to the data message. It should be understood that the process 1000 is a conceptual process and that in some embodiments, rather than strictly making a yes/no decision as to whether to apply any L7 services, the datapath simply makes a routing decision. The T0 routing configuration, in some embodiments, includes higher-priority redirection rules (i.e., policy-based routing rules) that indicate when a data message should be redirected to an L7 Pod (or group of L7 Pods) for application of a particular service. Thus, if any of these redirection rules apply to the data message (e.g., based on the source IP address and/or transport layer port, destination IP address and/or transport layer port, transport protocol, MAC addresses and/or VLAN, etc.), those redirection rules will be matched with a higher priority than the standard routing rules (e.g., based on longest prefix matching for the destination address).

If an L7 service needs to be applied, the process selects (at 1020) one of the L7 Pods for that service and sends the data message to the selected Pod. In some embodiments, if multiple L7 Pods implement a given L7 service, the datapath selects one of the services using a deterministic algorithm (e.g., a hash function). The network management system, in some embodiments, provides the configuration to the L4 Pod specifying the hash function to be used (e.g., the type of hash, which data message headers are hashed, etc.). Some embodiments also store connection state for the data message flow to which the data message belongs (so that the process 1000 only needs to be applied to the first data message in a data message flow). Other embodiments do not store such connection state but rely on the deterministic algorithm to send all of the data messages belonging to the same data flow to the same L7 service (in case that service is stateful). The networking constructs used to send the data message between the L4 Pod and the selected L7 Pod in some embodiments are described in more detail below.

The process then determines (at 1025) whether the data message is received back from the L7 Pod. It should be understood that, rather than an active determination by the datapath, in some embodiments this is a conceptual operation representing the datapath not performing any additional actions on the data message until the data message is received back. In some embodiments, the datapath stores state information for each data message when the data message is sent to an L7 Pod; this allows the datapath to determine which L7 services have already processed the data message upon its return. In this case, if the L7 service drops the data message (e.g., because it violates a filtering rule), then the state information will eventually time out. Other embodiments do not store such state information at the datapath. Instead, the routing configuration accounts for the L7 service from which a data message is received back in determining which matching rules can be applied (e.g., when receiving a data message back from a first L7 service, any redirection rules for other L7 services may be applied, with the redirection rules accounting for an order in which the services are to be applied).

If the data message is not received back from the L7 service (e.g., because the data message is dropped or blocked by that service), the process 1000 ends. Otherwise, the process 1000 returns to 1015 to determine (based on the redirection rules) whether additional L7 services need to be applied to the data message.

Once all of the L7 services are applied for the T0 logical router, the process 1000 logically routes (at 1030) the data message to one of the T1 logical routers that the datapath implements based on the destination IP address of the data message. That is, once the higher-priority redirection rules are eliminated, the T0 routing configuration specifies logically forwarding the data message to a T1 logical router that is also implemented by the L4 Pod. The T1 logical routers (and logical switches connected to these routers) are configured such that each IP address will only correspond to one of the T1 logical routers.

As such, the process 1000 applies (at 1035) the T1 logical router routing configuration to the data message. In some embodiments, the datapath stores configurations (e.g., routing tables) for each logical router that it implements and retrieves the configuration for a particular router to apply the configuration for that particular router to a data message. Based on the data message being routed to a particular T1 logical router's uplink interface (that connects logically to the T0 logical router), the datapath applies the configuration for that particular T1 logical router.

Next, the process 1000 determines (at 1040) whether to apply an L7 service to the data message. It should be understood that the process 1000 is a conceptual process and that in some embodiments, rather than strictly making a yes/no decision as to whether to apply any L7 services, the datapath simply makes a routing decision. The T1 routing configuration, in some embodiments, includes higher-priority redirection rules (i.e., policy-based routing rules) that indicate when a data message should be redirected to an L7

Pod (or group of L7 Pods) for application of a particular service. Thus, if any of these redirection rules apply to the data message (e.g., based on the source IP address and/or transport layer port, destination IP address and/or transport layer port, transport protocol, MAC addresses and/or VLAN, etc.), those redirection rules will be matched with a higher priority than the standard routing rules (e.g., based on longest prefix matching for the destination address).

If an L7 service needs to be applied, the process selects (at 1045) one of the L7 Pods for that service and sends the data message to the selected Pod. In some embodiments, if multiple L7 Pods implement a given L7 service, the datapath selects one of the services using a deterministic algorithm (e.g., a hash function). The network management system, in some embodiments, provides the configuration to the L4 Pod specifying the hash function to be used (e.g., the type of hash, which data message headers are hashed, etc.). Some embodiments also store connection state for the data message flow to which the data message belongs (so that the process 1000 only needs to be applied to the first data message in a data message flow). Other embodiments do not store such connection state but rely on the deterministic algorithm to send all of the data messages belonging to the same data flow to the same L7 service (in case that service is stateful). The networking constructs used to send the data message between the L4 Pod and the selected L7 Pod in some embodiments are described in more detail below.

The process 1000 then determines (at 1050) whether the data message is received back from the L7 Pod. It should be understood that, rather than an active determination by the datapath, in some embodiments this is a conceptual operation representing the datapath not performing any additional actions on the data message until the data message is received back. In some embodiments, the datapath stores state information for each data message when the data message is sent to an L7 Pod; this allows the datapath to determine which L7 services have already processed the data message upon its return. In this case, if the L7 service drops the data message (e.g., because it violates a filtering rule), then the state information will eventually time out. Other embodiments do not store such state information at the datapath. Instead, the routing configuration accounts for the L7 service from which a data message is received back in determining which matching rules can be applied (e.g., when receiving a data message back from a first L7 service, any redirection rules for other L7 services may be applied, with the redirection rules accounting for an order in which the services are to be applied).

If the data message is not received back from the L7 service (e.g., because the data message is dropped or blocked by that service), the process 1000 ends. Otherwise, the process 1000 returns to 1040 to determine (based on the redirection rules) whether additional L7 services need to be applied to the data message.

Once all of the L7 services are applied for the T1 logical router, the process 1000 logically routes (at 1055) the data message to its destination. In some embodiments, the datapath applies the T1 logical router configuration to determine a logical output port of the T1 logical router based on the destination IP address. This logical output port may correspond to a logical switch, and the datapath then applies the logical switching configuration for that logical switch (based on principles of first-hop logical forwarding). The logical switching configuration identifies a logical egress port based on the destination MAC address of the data message, and that logical egress port corresponds to a physical destination (e.g., another Pod on the same node or a different node).

Finally, the process 1000 forwards (at 1060) the data message out of the datapath to its destination. In some embodiments, the datapath encapsulates the data message using its own network interface address and that of a managed forwarding element on a destination Pod or node. In other embodiments, the datapath does not perform any encapsulation (though if the data message is sent between nodes, then a forwarding element in the node may encapsulate the data message for transmission between nodes). It should also be noted that, in some embodiments, the datapath performs network address translation (NAT) on the data message according to either the T0 or T1 logical router configuration (e.g., to change the destination network address from a public IP address to an internal private IP address).

Figure 11:
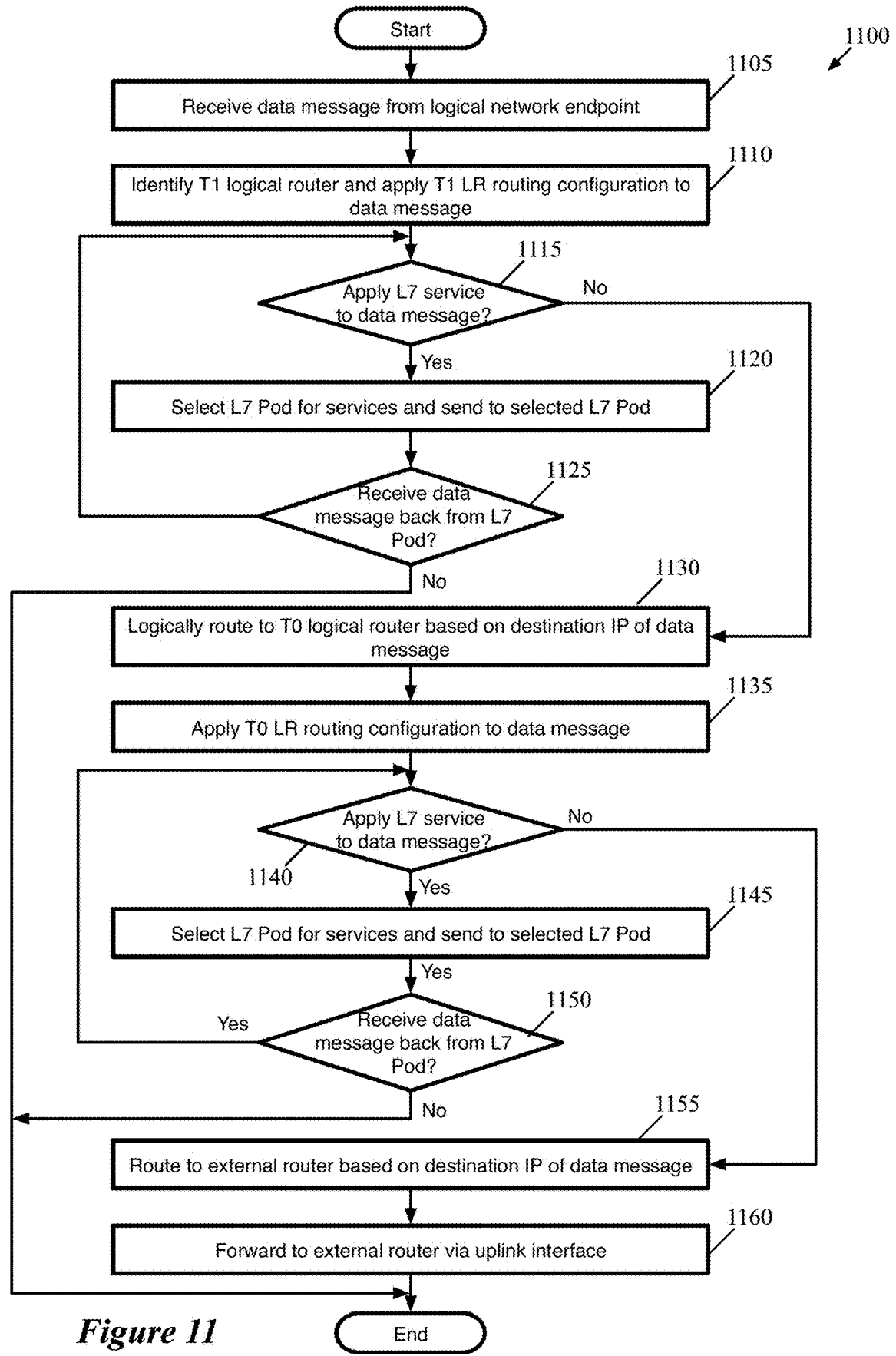
FIG. 11 conceptually illustrates a process of some embodiments for processing an outgoing data message at an L4 Pod.

FIG. 11 conceptually illustrates a process 1100 of some embodiments for processing an outgoing data message at an L4 Pod (e.g., at the L4 Pod datapath). This process 1100, it should be noted, applies specifically to data messages that are received from within the logical network and directed to an external network and are thus processed by both a T0 logical router and a T1 logical router (e.g., as opposed to data messages sent from network endpoints attached to a logical switch connected directly to the T0 logical router or sent between network endpoints behind two different T1 logical routers).

As shown, the process 1100 begins by receiving (at 1105) a data message from a logical network endpoint (that is addressed to an external destination). In some embodiments, this data message will have been logically processed by another network forwarding element (also configured by the network management system to implement various logical network elements) that resides either at the Pod housing the logical network endpoint or on the node on which that Pod operates. This logical network processing identifies that the data message requires processing by the centralized component of the T1 logical router (e.g., based on the destination network address of the data message) and therefore selects one of the L4 Pods and sends (e.g., tunnels) the data message to an interface of the L4 Pod (i.e., a different interface than its uplink interfaces).

The process 1100 identifies (at 1110) a T1 logical router and applies the T1 logical router routing configuration to the data message. In some embodiments, the datapath stores configurations (e.g., routing tables) for each logical router that it implements and retrieves the configuration for a particular router to apply the configuration for that particular router to a data message. Some embodiments identify the correct T1 logical router configuration to apply based on information appended to the data message (e.g., within an encapsulation applied to the data message). In some such embodiments, the initial network element that processes the data message identifies the T1 logical router and embeds this information in an encapsulation applied to the data message when sending the data message to the L4 Pod.

Next, the process 1100 determines (at 1115) whether to apply an L7 service to the data message. It should be understood that the process 1100 is a conceptual process and that in some embodiments, rather than strictly making a yes/no decision as to whether to apply any L7 services, the datapath simply makes a routing decision. The T1 routing configuration, in some embodiments, includes higher-priority redirection rules (i.e., policy-based routing rules) that indicate when a data message should be redirected to an L7 Pod (or group of L7 Pods) for application of a particular service. Thus, if any of these redirection rules apply to the data message (e.g., based on the source IP address and/or transport layer port, destination IP address and/or transport layer port, transport protocol, MAC addresses and/or VLAN, etc.), those redirection rules will be matched with a higher priority than the standard routing rules (e.g., based on longest prefix matching for the destination address).

If an L7 service needs to be applied, the process selects (at 1120) one of the L7 Pods for that service and sends the data message to the selected Pod. In some embodiments, if multiple L7 Pods implement a given L7 service, the datapath selects one of the services using a deterministic algorithm (e.g., a hash function). The network management system, in some embodiments, provides the configuration to the L4 Pod specifying the hash function to be used (e.g., the type of hash, which data message headers are hashed, etc.). Some embodiments also store connection state for the data message flow to which the data message belongs (so that the process 1100 only needs to be applied to the first data message in a data message flow). Other embodiments do not store such connection state but rely on the deterministic algorithm to send all of the data messages belonging to the same data flow to the same L7 service (in case that service is stateful). The networking constructs used to send the data message between the L4 Pod and the selected L7 Pod in some embodiments are described in more detail below.

The process 1100 then determines (at 1125) whether the data message is received back from the L7 Pod. It should be understood that, rather than an active determination by the datapath, in some embodiments this is a conceptual operation representing the datapath not performing any additional actions on the data message until the data message is received back. In some embodiments, the datapath stores state information for each data message when the data message is sent to an L7 Pod; this allows the datapath to determine which L7 services have already processed the data message upon its return. In this case, if the L7 service drops the data message (e.g., because it violates a filtering rule), then the state information will eventually time out. Other embodiments do not store such state information at the datapath. Instead, the routing configuration accounts for the L7 service from which a data message is received back in determining which matching rules can be applied (e.g., when receiving a data message back from a first L7 service, any redirection rules for other L7 services may be applied, with the redirection rules accounting for an order in which the services are to be applied).

If the data message is not received back from the L7 service (e.g., because the data message is dropped or blocked by that service), the process 1100 ends. Otherwise, the process 1100 returns to 1115 to determine (based on the redirection rules) whether additional L7 services need to be applied to the data message.

Once all of the L7 services are applied for the T1 logical router, the process 1100 logically routes (at 1130) the data message to the T0 logical router that the datapath implements based on the destination IP address of the data message. That is, once the higher-priority redirection rules are eliminated, the T1 routing configuration specifies logically forwarding the data message (which has an external destination address) to the T0 logical router (e.g., via the logical uplink interface of the T1 logical router that connects to the T0 logical router).

As such, the process 1100 applies (at 1135) the T0 logical router routing configuration to the data message. In some embodiments, the datapath stores configurations (e.g., routing tables) for each logical router that it implements and retrieves the configuration for a particular router to apply the configuration for that particular router to a data message.

Based on the data message being routed to the T0 logical router downlink interface that connects logically to the T1 logical router that previously processed the data message, the datapath applies the configuration for the T0 logical router.

Next, the process 1100 determines (at 1140) whether to apply an L7 service to the data message. It should be understood that the process 1100 is a conceptual process and that in some embodiments, rather than strictly making a yes/no decision as to whether to apply any L7 services, the datapath simply makes a routing decision. The T0 routing configuration, in some embodiments, includes higher-priority redirection rules (i.e., policy-based routing rules) that indicate when a data message should be redirected to an L7 Pod (or group of L7 Pods) for application of a particular service. Thus, if any of these redirection rules apply to the data message (e.g., based on the source IP address and/or transport layer port, destination IP address and/or transport layer port, transport protocol, MAC addresses and/or VLAN, etc.), those redirection rules will be matched with a higher priority than the standard routing rules (e.g., based on longest prefix matching for the destination address).

If an L7 service needs to be applied, the process selects (at 1145) one of the L7 Pods for that service and sends the data message to the selected Pod. In some embodiments, if multiple L7 Pods implement a given L7 service, the datapath selects one of the services using a deterministic algorithm (e.g., a hash function). The network management system, in some embodiments, provides the configuration to the L4 Pod specifying the hash function to be used (e.g., the type of hash, which data message headers are hashed, etc.). Some embodiments also store connection state for the data message flow to which the data message belongs (so that the process 1100 only needs to be applied to the first data message in a data message flow). Other embodiments do not store such connection state but rely on the deterministic algorithm to send all of the data messages belonging to the same data flow to the same L7 service (in case that service is stateful). The networking constructs used to send the data message between the L4 Pod and the selected L7 Pod in some embodiments are described in more detail below.

The process 1100 then determines (at 1150) whether the data message is received back from the L7 Pod. It should be understood that, rather than an active determination by the datapath, in some embodiments this is a conceptual operation representing the datapath not performing any additional actions on the data message until the data message is received back. In some embodiments, the datapath stores state information for each data message when the data message is sent to an L7 Pod; this allows the datapath to determine which L7 services have already processed the data message upon its return. In this case, if the L7 service drops the data message (e.g., because it violates a filtering rule), then the state information will eventually time out. Other embodiments do not store such state information at the datapath. Instead, the routing configuration accounts for the L7 service from which a data message is received back in determining which matching rules can be applied (e.g., when receiving a data message back from a first L7 service, any redirection rules for other L7 services may be applied, with the redirection rules accounting for an order in which the services are to be applied).

If the data message is not received back from the L7 service (e.g., because the data message is dropped or blocked by that service), the process 1100 ends. Otherwise, the process 1100 returns to 1140 to determine (based on the redirection rules) whether additional L7 services need to be applied to the data message.

Once all of the L7 services are applied for the T0 logical router, the process 1100 logically routes (at 1155) the data message to an external router based on the destination IP address of the data message. In some embodiments, the datapath routes the data message to one of its uplink interfaces. If the uplinks connect to the same external router, then the datapath may load balance data traffic across the uplinks. However, if the uplinks connect to different external routers (e.g., one for connection to the public Internet and another for connection to another datacenter), then the routing configuration will select one of the uplinks based on the destination address.

Finally, the process 1100 forwards (at 1160) the data message to the external router via the selected uplink interface. The data message is then sent to this external router via an egress mechanism for the cluster in some embodiments. It should also be noted that, in some embodiments, the datapath performs network address translation (NAT) on the data message according to either the T1 or T0 logical router configuration (e.g., to change the source network address from an internal private IP address to a public IP address).

In addition to configuring the datapath to process data messages, the network management system provides a routing protocol (e.g., Border Gateway Protocol (BGP)) configuration for the L4 Pod. In some embodiments, the L4 Pod executes a routing protocol application (either as one of the control threads of the datapath or as a separate process from the datapath). This routing protocol application peers with the external router (via the uplink interfaces of the first-tier logical router) in order to attract traffic from the external router. In some embodiments, the routing protocol application is also configured to advertise various logical network subnets (and/or public IP addresses) to the external router. These subnets and/or public IP addresses, in some embodiments, are specified in the configuration of the various second-tier logical routers at the network management system.

Figure 12:
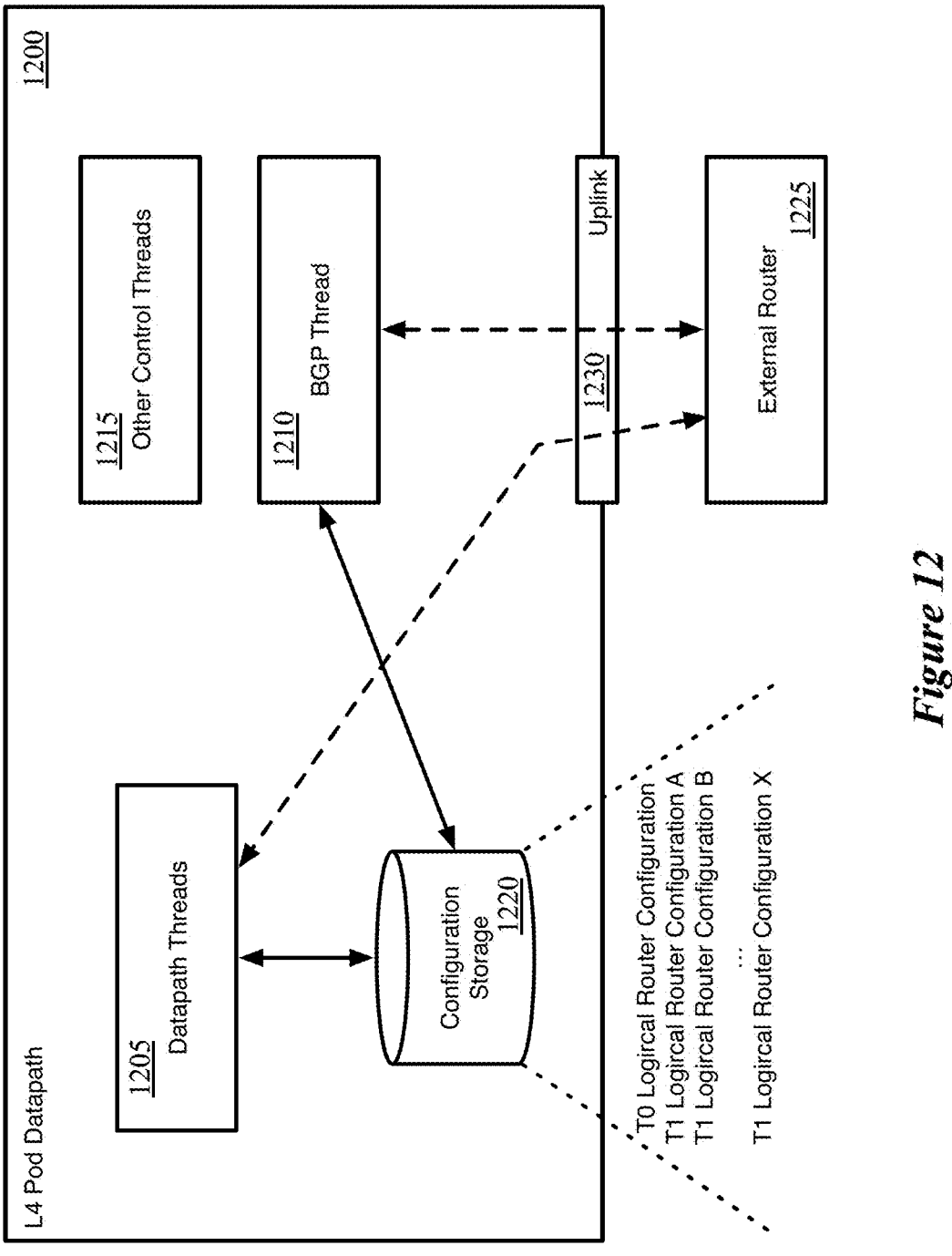
FIG. 12 conceptually illustrates the architecture of a datapath executing on an L4 Pod in some embodiments.

FIG. 12 conceptually illustrates the architecture of a datapath 1200 executing on an L4 Pod in some embodiments. As noted above, in some embodiments the datapath 1200 is a DPDK-based datapath. The datapath 1200 of some embodiments includes a set of run-to-completion (datapath) threads 1205 used for data message processing (e.g., that perform the operations shown in FIGS. 10 and 11) in addition to various control threads 1210 and 1215 for handling control plane operations. In this figure, the control threads include a BGP thread 1210 as well as various other control threads (e.g., for handling BFD, MAC learning, etc.) 1215.

Both the datapath threads 1205 and the BGP thread 1210 (as well as some of the additional control threads 1215) use a configuration storage 1220 of the datapath 1200. In some embodiments, this storage 1220 is separate from the configuration database stored on the L4 Pod to which the network management system provides configuration data. Rather, a network management system agent also executing on the Pod retrieves that configuration data and uses the configuration data to provide routing tables for each logical router (as well as configuration for, e.g., logical switches) that are stored in the datapath's configuration storage 1220. In some embodiments, the configuration storage 1220 stores separate routing tables (e.g., virtual routing and forwarding (VRF) tables) for each of the logical routers implemented by the datapath 1200. In addition, the logical router configuration includes the policy-based routing rules that take precedence over the longest prefix match rules to handle redirection of data messages to the L7 Pods. As shown, the configuration storage 1220 stores configuration for the T0 logical router implemented by the datapath 1200 as well as all of the various T1 logical routers. The datapath threads 1205, when processing a data message, retrieve the configuration (e.g., VRF table) for the appropriate logical router when applying that logical router to a data message.

The BGP thread 1210, as noted, also makes use of the data (e.g., the VRF tables) stored in the configuration storage 1220. In some embodiments, the BGP thread 1210 peers with an external router 1225 via the uplink 1230 of the datapath 1200. That is, the BGP thread 1210 is configured to setup a BGP session with the external router 1225 (if the datapath connects to multiple external routers, some embodiments setup separate BGP sessions with each such router). This allows the datapath 1200 to (i) attract traffic from the external router 1225 that is directed to the logical network endpoints and (ii) learn network addresses for which data traffic should be forwarded to the external router 1225 as a next hop. In this example, the datapath 1200 has a single uplink 1230 configured, but it should be understood that in other embodiments the datapath may have multiple uplinks that provide connectivity to, e.g., different external routers. In this case, the BGP thread 1210 (or separate BGP threads) would pair with each of the external routers via the different uplinks.

In some embodiments, the BGP thread 1210 is configured to advertise various logical network subnets (and/or public IP addresses) to the external router. These subnets and/or public IP addresses, in some embodiments, are specified in the configuration of the various second-tier logical routers at the network management system and notated in the VRFs of the configuration storage 1220 as network addresses to advertise. Each second-tier logical router may be configured to advertise various network addresses relating to the logical switches that connect to that logical router. This configuration is transferred to the first-tier logical router as this is the logical router that connects to the external network and therefore actually advertises the network addresses to the external routers.

The BGP thread 1210 also learns routes from the external router 1225. For an external router that provides connectivity to other datacenters, these learned routes may include various logical network subnets available through that external router at the other datacenters. For an external router that provides public Internet connectivity, the learned routes may include various public Internet subnets. When the L4 Pod interfaces with multiple external routers, a default route may route traffic to one of the external routers (e.g., to the public Internet via one of the uplink interfaces) but different routes can be learned for different external network addresses via the routing protocol application. In some embodiments, the BGP thread 1210 modifies the T0 logical router configuration stored in the configuration storage 1220 based on these learned routes.

In addition to configuring the routing for the datapath (i.e., configuration of both the BGP thread as well as the datapath), the network management system of some embodiments provides configuration data for the L7 Pods. In some embodiments, the L4 Pod is also responsible for helping to configure the L7 Pods for the logical routers that it implements. The L4 Pod receives configuration data for a given logical router from the network management system, provides Pod definition data to the Kubernetes API server to create an L7 Pod, and then communicates directly with the L7 Pod to further configure that Pod. Specifically, in some embodiments, the L4 Pod provides to the L7 Pod (i) networking information to enable a connection for data messages between the L4 and L7 Pods and (ii) configuration data that defines the L7 services for the L7 Pod to perform on the data messages sent from the L4 Pod to the L7 Pod (i.e., via said connection enabled by the networking information).

Figure 13:
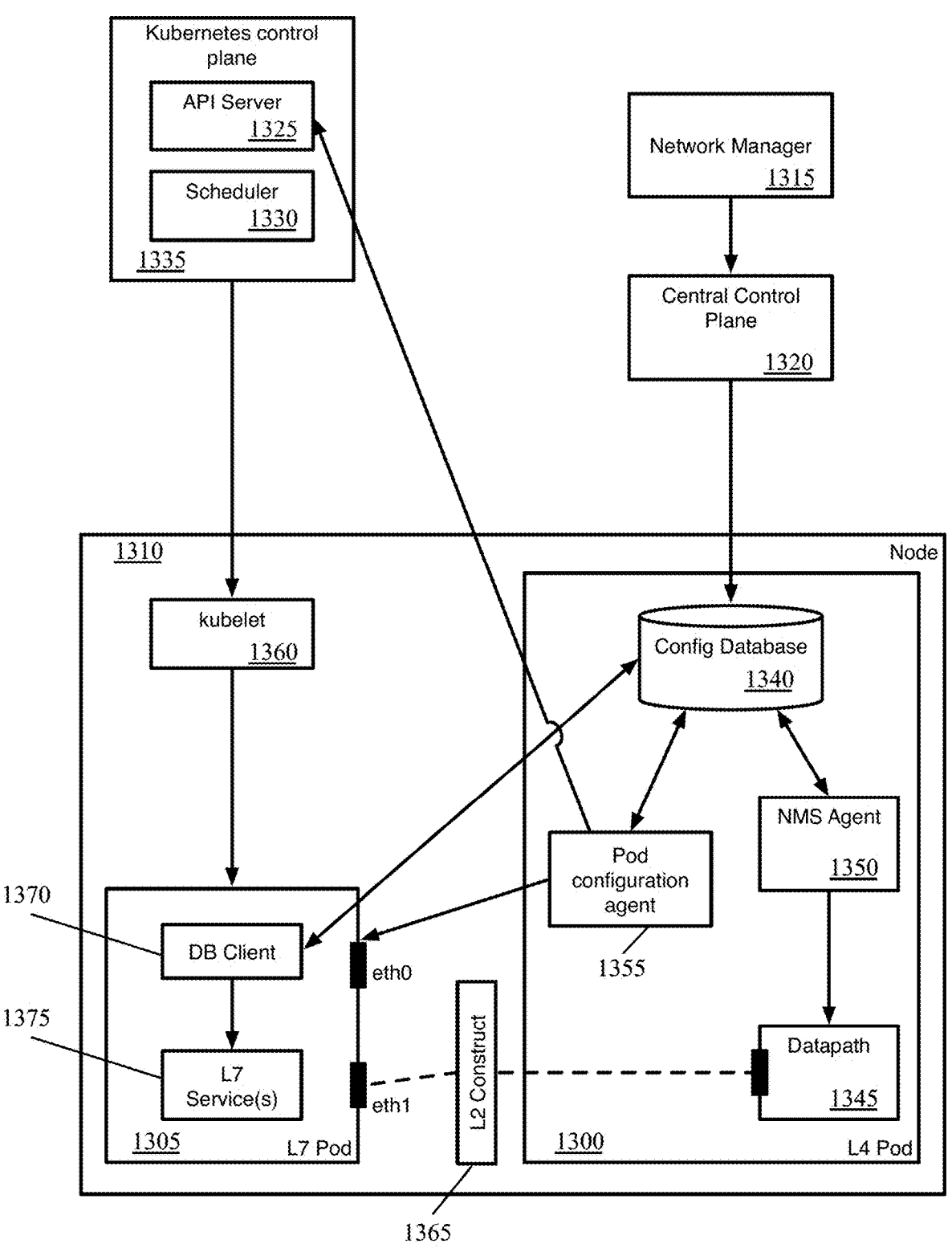
FIG. 13 conceptually illustrates the architecture of an L4 Pod of some embodiments that helps to create and configure an L7 Pod operating on the same node as the L4 Pod.

FIG. 13 conceptually illustrates a more detailed architecture of an L4 Pod 1300 of some embodiments, illustrating components that help to create and configure an L7 Pod 1305 operating on the same node 1310 as the L4 Pod. In addition to the Pods 1300 and 1305 operating on the node 1310, the figure also illustrates the network manager 1315 (e.g., management plane) and central control plane 1320 of the external network management system as well as the API server 1325 and scheduler 1330 of the Kubernetes control plane 1335.

The network management system entities, the network manager 1315 and the central control plane 1320, are described above by reference to FIG. 2. To configure the logical routers, the central control plane 1320 receives logical router configuration data from the network manager 1315 (along with other logical network configuration data), determines that this logical router configuration should be provided to the L4 Pod 1300 (possibly in addition to other entities that implement some or all components of the logical routers), and provides the logical router configuration data to the L4 Pod 1300.

The Kubernetes control plane 1335 is also described above. The API server 1325, as noted, is responsible for creating and deleting various Kubernetes resources (e.g., Pods, services, custom resources, etc.) based on API requests. These requests may come from external sources (e.g., the network manager 1315) as well as internal sources (e.g., the L4 Pod 1300). Upon receipt of a command to create a Pod or other resource, in some embodiments the API server defines the Pod in a configuration state database (not shown in this figure). The scheduler 1330 is responsible for assigning the newly created Pod to one of the nodes based on a variety of factors (e.g., resources available, locations of related Pods, etc.). The control plane 1335 (e.g., the API server 1325 or another entity) then informs the node of the assigned Pod so that the Pod can be created on that node.

The kubelet 1360, while separate from the Kubernetes control plane 1335, acts in concert with the control plane. The kubelet is a Kubernetes component that executes on each node of a cluster and acts as an agent for the control plane 1335. The kubelet 1360 registers the node 1310 with the API server 1325. In addition, the kubelet 1360 is responsible for creating and/or deleting Pods on its node 1310 and ensuring that these Pods are running and healthy.

The L4 Pod 1300 stores a configuration database 1340, in addition to executing a datapath 1345, a network management system agent 1350, and a Pod configuration agent 1355. As described previously, the configuration database (e.g., NestDB) 1340 receives and stores configuration data for the logical routers implemented by the L4 Pod 1300 from the central control plane 1320. In some embodiments, for each logical router, this configuration data includes at least (i) logical forwarding configuration, (ii) L7 service configuration, and (iii) internal network connectivity between the L4 and L7 pods. The logical forwarding configuration defines routes (as well as L3/L4 services, such as network address translation) to be implemented by the L4 Pod 1300, while the L7 service configuration defines the services to be performed by the logical router and the configuration for each of those services. The internal network connectivity, in some embodiments, is defined by the network management system (e.g., is transparent to the network administrator) and specifies how the L4 Pod 1300 and the L7 Pod(s) send data traffic back and forth.

The network management system agent 1350, in some embodiments, reads logical forwarding configuration data for each of the logical routers that the L4 Pod 1300 is responsible for implementing from the configuration database 1340 and uses this logical forwarding configuration data to configure the datapath 1345 to perform logical forwarding operations on data messages sent to the L4 Pod for processing by any of these logical routers (e.g., to perform the operations shown in FIGS. 10 and 11. As described previously, the datapath 1345 implements the data plane for the logical routers.

The Pod configuration agent 1355 is responsible for the creation and at least part of the configuration of the L7 Pods (e.g., the L7 Pod 1305 for the various logical routers implemented by the L4 Pod 1300. When the Pod configuration agent 1355 detects that a new L7 Pod needs to be created, the Pod configuration agent interacts with the cluster API server 1325 to create this Pod. Similarly, the Pod configuration agent 1355 detects when an L7 Pod should be deleted and interacts with the cluster API server 1325 to remove the L7 Pod. To create the L7 Pod 1305, the Pod configuration agent 1355 sends a message to the API server with a set of Pod definition data that defines specifications for the Pod. This causes the API server 1325 to create the Pod and, in this case, for the scheduler to assign the new L7 Pod to the node 1310. The Kubernetes control plane 1335 then notifies the kubelet 1360 to create the new Pod 1305 on the node 1310.

The Pod configuration agent 1355 is also responsible for providing the network interface configuration to the L7 Pod 1305. When the L7 Pod 1305 is initially created, it has a first interface (eth0), which is used for typical inter-Pod communications (e.g., by the Pod configuration agent 1355). In some embodiments, the Pod configuration agent 1355 provides the L7 Pod 1305 with network interface configuration attributes (e.g., MAC address, VLAN ID, and IP address) for a second interface. In some embodiments, the central control plane 1320 provides this network interface information to the configuration database 1340, from which the Pod configuration agent 1355 retrieves the information to send the information to the L7 Pod 1305. This causes the L7 Pod 1305 to execute a script to configure a new interface (the interface eth1) for connectivity with the datapath 1345 executing in the L4 Pod. The datapath 1345 is also configured with this information (e.g., by the network management system agent 1350) so that it can send data messages to the L7 Pod for processing as needed. These data messages are sent via an L2 construct 1365 on the node 1310, which is described in further detail below.

As shown, the L7 Pod 1305 executes a database client 1370 and L7 services 1375. In some embodiments, the type of L7 services 1375 that execute in the L7 Pod 1305 are determined based on the Pod definition data specified by the Pod configuration agent 1355 (and thus the Pod specification provided to the kubelet 1360 by the control plane 1335). Thus, an L7 Pod performing TLS proxy will execute different L7 service module(s) than an L7 Pod performing L7 load balancing. The database client 1370, in some embodiments, is configured to retrieve the service processing configuration from the configuration database 1340. In some embodiments, the database client 1370 listens for its specific configuration (pushed down to the configuration database

1340 from the central control plane 1320 based on administrator configuration) and retrieves this configuration. The database client 1370 provides the configuration to the L7 service module(s) 1375 so that these modules perform their L7 services in accordance with the administrator-specified configuration.

The L4 Pod is also responsible for configuring L7 Pods that execute on other nodes (i.e., not on the same node as the L4 Pod). When an L7 Pod should be deployed on a different node than the L4 Pod, network management system and Kubernetes control plane operate in the same manner as described for FIG. 13. In addition, the deployment and configuration of the L7 Pod occurs in the same manner, except that the communications travel through an inter-node underlay network. The nature of this underlay network depends on the datacenter within which the nodes execute as well as whether the nodes are on the same host or different hosts. In addition, data traffic sent between the L4 Pod datapath and the L7 Pod is sent through L2 constructs on their respective nodes in addition to the underlay network.

Figure 14:
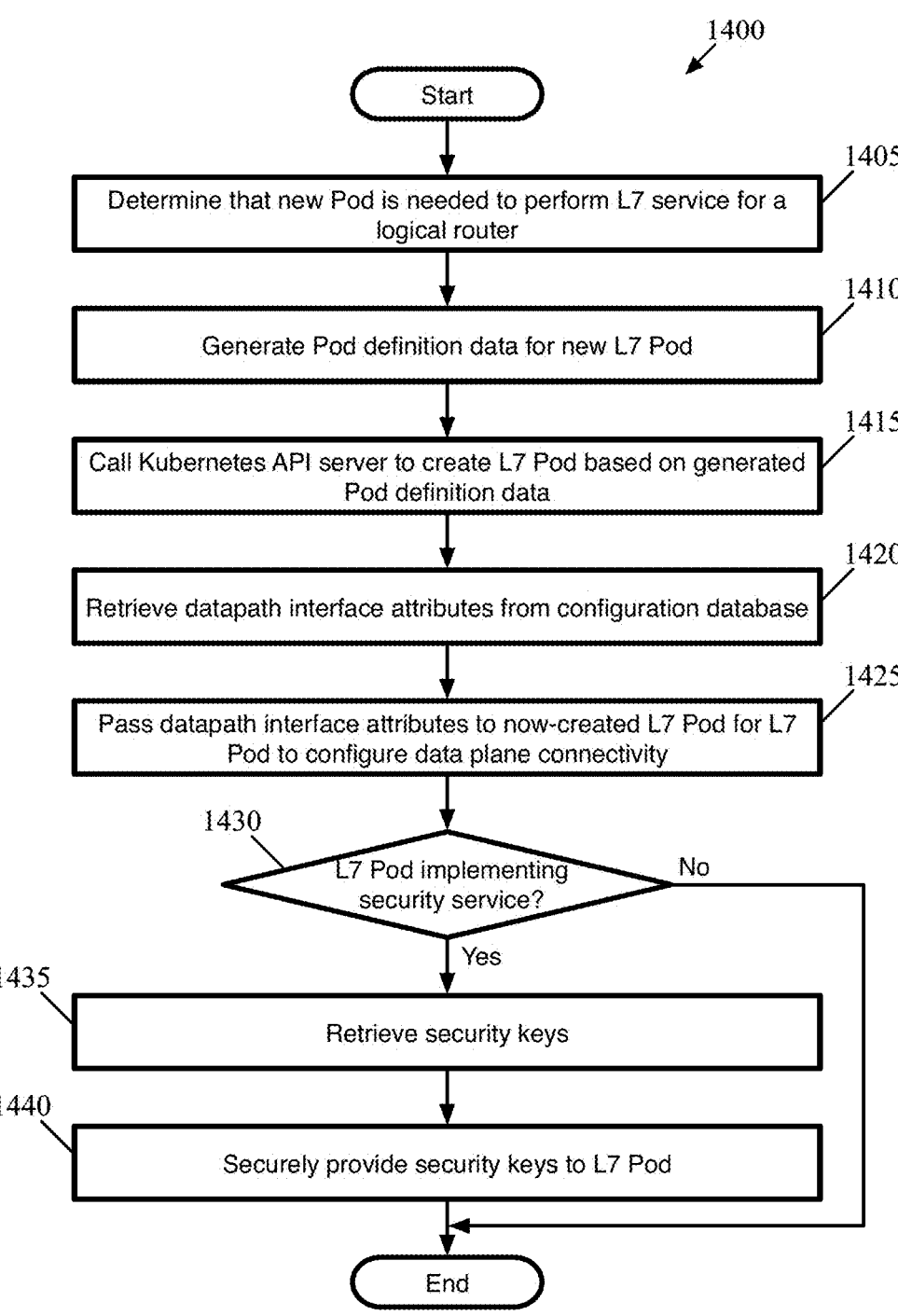
FIG. 14 conceptually illustrates a process of some embodiments for instantiating and configuring a new L7 Pod to implement an L7 service for a logical router.

As noted, the operations performed by the L4 Pod to configure an L7 Pod are the same irrespective of whether the L7 Pod is on the same node as the L4 Pod or a different node. FIG. 14 conceptually illustrates a process 1400 of some embodiments for instantiating and configuring a new L7 Pod to implement an L7 service for a logical router. The process 1400 is performed by an L4 Pod (e.g., by the Pod configuration agent on the L4 Pod) that implements the logical forwarding and/or L2-L4 services for the same logical router (possibly in addition to multiple other logical routers).

As shown, the process 1400 begins by determining (at 1405) that a new L7 Pod is needed to perform an L7 service (or multiple L7 services) for a logical router. The Pod configuration agent of the L4 Pod may make this determination upon detecting that configuration data has been stored in the configuration database for a new logical router with one or more services configured or if configuration data for a new service for an existing logical router has been stored in the configuration database. In some embodiments, the Pod configuration agent listens to the configuration database to detect any updates to L7 service configurations. In addition, in some embodiments, the Pod configuration agent determines when additional Pods are required for an existing L7 service (e.g., based on the load on the existing L7 Pods implementing that service). Similarly, the agent may determine when the number of Pods implementing a particular service for a particular logical router should be reduced, in which case a different process is performed to delete an L7 Pod.

Upon determining that a new L7 Pod needs to be created, the process 1400 generates (at 1410) Pod definition data for this Pod. In some embodiments, the Pod configuration agent generates a yaml (Yaml Ain't Markup Language) file that defines the specifications for the Pod. In some embodiments, the Pod specification can include the container image to use (e.g., the application to be executed in the Pod, depending on the type of service(s) to be executed by the Pod), the allocated memory and/or CPU, initialization scripts, and security policies for the Pod. The type of application(s) to be executed is determined based on configuration data specifying the type of L7 services. The other information is also be specified by the network management system via the configuration database in some embodiments. In other embodiments, the Pod configuration agent is configured to determine the hardware resources to be allocated to the pod.

The process 1400 then calls (at 1415) the Kubernetes API server to create the new L7 Pod based on the generated Pod definition data. In some embodiments, the Pod definition data is formatted so that the API server can define the Pod using the various specifications. The API server defines the new Pod in a cluster state database in some embodiments, which initiates a process by which the scheduler assigns the Pod to a node and the kubelet on that node creates the Pod per the specifications.

When the L7 Pod is created on its node, it will typically have a default interface (often referred to as eth0) that can be used for inter-Pod communication. However, some embodiments define a second interface for a connection (e.g., an L2 connection) between the L7 Pod and the L4 Pod, via which logical network data messages (i.e., those data messages requiring L7 service processing) are passed between the Pods.

To define this interface, the process retrieves (at 1420) datapath interface attributes from the configuration database. In some embodiments, the network management system provides the datapath interface information to the configuration database on the L4 Pod after internally generating the information. That is, unlike the logical router forwarding and service configurations, the datapath interface information is not based on administrator input. The interface configuration attributes, in some embodiments, include a MAC address, a VLAN ID, and an IP address for the interface.

The process 1400 passes (at 1425) these datapath interface attributes to the L7 Pod so that the L7 Pod can configure its data plane connectivity. In some embodiments, the MAC and IP addresses for the interface of the L4 Pod datapath are also provided to the L7 Pod so that it can communicate with that datapath. In some embodiments, to provide the interface configuration information to the L4 Pod, the Pod configuration agent uses Kubernetes ConfigMap. This provision of data causes the L7 Pod to execute a script to configure a new interface (e.g., eth1) for connectivity with the datapath executing in the L4 Pod. This new interface has the MAC address, VLAN tag, and IP address provided by the L4 Pod. In addition, the datapath on the L4 Pod is also configured with this interface information (e.g., by the network management system agent on the L4 Pod) so that the datapath can send data messages to the L7 Pod for processing as needed.

Next, the process 1400 determines (at 1430) whether the L7 Pod implements a security service. Certain L7 services (e.g., TLS proxy) require the L7 Pod to store a set of keys for use in providing the security service(s). If not, then the process 1400 ends, as the Pod configuration agent has performed all of its tasks in order to configure the L7 Pod.

If the L7 Pod is implementing a security service, the process 1400 retrieves (at 1435) security keys. In some embodiments, the keys are published to the L4 Pod via a management plane agent that bypasses the central control plane. The process 1400 then securely provides (at 1440) these security keys to the L7 Pod. In some embodiments, the Pod configuration agent uses a Kubernetes secret scheme to provide these keys to the L7 Pod.

As described, the network management system generates the service configuration for the L7 Pods. In some embodiments, when a network administrator defines a service for a logical router, the administrator (i) specifies that the service should be performed at the logical router and (ii) defines rules for the service to apply. The former (specification of the service) leads to the creation of one or more L7 Pods for the service within the cluster (as described above) while in many cases the latter causes the network management system to generate configuration rules for both the L4 Pod and the L7 Pods. That is, for a specific L7 service rule, the network management system generates (i) a redirection (policy-based routing) rule specifying when certain data messages need to be redirected by the L4 Pod to an L7 Pod for a specific service and (ii) the L7 processing rule for applying that L7 service rule.

FIG. 15 conceptually illustrates a process 1500 of some embodiments for generating both a redirection rule for the L4 Pod datapath and an L7 service processing rule for the L7 Pod based on the specification of a rule for an L7 service of a logical router. The process 1500 is performed by a network management system (e.g., by the management plane and/or central control plane) in some embodiments. The process 1500 may be performed when the L7 service is initially defined or at a later time if a user adds a new processing rule for the L7 service. This process will be described in part by reference to FIG. 16, which conceptually illustrates a service rule 1600 for which both a redirection rule 1605 and an L7 service processing rule 1610 are generated.

Figure 16:
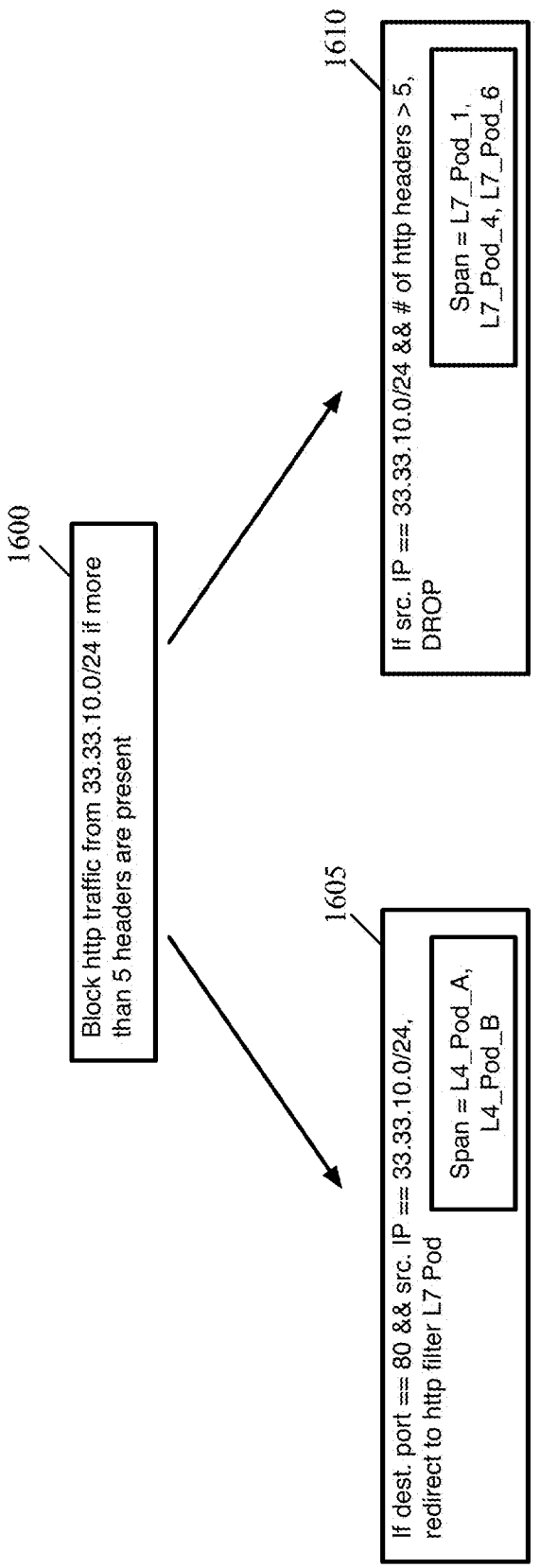
FIG. 16 conceptually illustrates a service rule for which both a redirection rule and an L7 service processing rule are generated.

As shown, the process 1500 begins by receiving (at 1505) a service rule for an L7 service of a logical router. Such a service rule will often have an L2-L4 component (e.g., specifying the data traffic to which the rule applies) as well as an L5-L7 component (e.g., specifying characteristics of the upper layer headers to which the rule applies) in addition to an action to take if those characteristics are met. For instance, a service rule will commonly indicate that specific types of traffic (e.g., http or https traffic meeting specific criteria) should be blocked if the traffic is sent from a particular source (or from any external source). The service rule 1600 shown in FIG. 16 is an http filtering rule that specifies to block any http traffic from the subnet 33.33.10.0/24 if more than 5 headers are present (i.e., in the http portion of the data message).

The process 1500 identifies (at 1510) the L2-L4 properties of the data message to which the rule applies. These properties are the matching characteristics of the rule that are based only on L2-L4 data message headers (e.g., MAC addresses, VLAN tags, IP addresses, transport layer port numbers, transport layer protocol).

The process 1500 then determines (at 1515) whether the L2-L4 properties are already covered by an existing redirection rule for the L7 service. That is, the process determines whether an existing redirection rule exists such that any data message with the identified L2-L4 properties would already match that redirection rule. For example, if a previously generated redirection rule for the same L7 service specifies for all data traffic to be redirected to the service (or all data traffic with the same destination port), then additional, more specific redirection rules are not needed for the L7 service. If the L2-L4 properties are already covered by an existing redirection rule for the same service, the process 1600 does not generate any additional rules.

On the other hand, if the L2-L4 properties are not already covered, the process 1500 generates (at 1520) a new redirection rule based on these properties and identifies the span of that rules as being all of the presently deployed L4 Pods. In the example shown in FIG. 16, the redirection rule 1605 is a match over both the specified destination IP address (33.33.10.0/24) and destination port 80 (for http traffic). That is, even if a data message matches the IP address, if the destination port is different then the data message does not need to be redirected (at least for the purposes of this rule). If a redirection rule for http traffic having any destination address, or even an encompassing subnet (e.g., 33.33.0.0/16), already existed, then there would be no need to generate the rule 1605. The span of the generated rule 1605 is both of the currently deployed L4 Pods (L4_Pod_A and L4_Pod_B) that implement the logical router for which the L7 service is defined.

The process 1500 also generates (at 1525) a service processing rule for the L7 Pod and identifies the span of the L7 rule as the deployed L7 Pods implementing the specific logical service for the specific logical router. While the L4 Pod does not have the ability to inspect the L7 headers of a data message to determine whether that data message meets the specific criteria (the L4 Pod does not inspect L7 headers as this typically requires greater resource usage), the L7 Pod can match on L5-L7 headers in addition to the L2-L4 headers. The L7 service processing rule may also specify an action to take on data messages that match its set of conditions (e.g., to allow, drop, or modify the data message).

In the example shown in FIG. 16, the service processing rule 1610 matches on (i) the source IP address and (ii) the number of http headers in the data message. In this case, the L7 service only handles http traffic (i.e., traffic with destination port 80) and thus the match on this port number is not needed. On the other hand, some embodiments include the destination port number in the match conditions as well in case any future redirection rules send data messages with other destination port numbers to the L7 Pods implementing the http filtering service. If these match conditions are met by a data message sent to the L7 service, the service processing rule 1610 specifies to drop the data message. The span of the generated service processing rule 1610 is all of the currently deployed L7 Pods (L7_Pod_1, L7_Pod_4, and L7_Pod_6) that implement the http filtering service for the particular logical router.

Finally, the process 1500 distributes (at 1530) both of the generated rules to the configuration database of the L4 Pod(s), then ends. The network management system agent on each of the L4 Pods configures its respective datapath to incorporate the new redirection rule. If only one L4 Pod is deployed, then the L7 Pods will retrieve the new service processing rule from the configuration database at that L4 Pod. If multiple L4 Pods are deployed, then the L7 Pods use different techniques to retrieve the service processing rule from a specific one of the L4 Pods in different embodiments. In some embodiments, the database client on each L7 Pod listens for relevant changes on the configuration database at a specific one of the L4 Pods (which may be the same for all of the L7 Pods or different for different L7 Pods).

When forwarding a data message to an L7 Pod, the datapath on the L4 Pod uses the L2 connection that is setup between the L4 Pod and the L7 Pod. As described above, in some embodiments, the Pod configuration agent on the L4 Pod provides the L7 Pod with network interface information for a new interface that is used for this connection between the L4 and L7 Pods. The datapath forwards data messages in need of L7 processing by a particular L7 Pod to this interface of the L7 Pod. In addition, after performing service processing on the data message, the L7 Pod sends the data message back to the L4 Pod for further processing (assuming that the data message is not blocked/dropped by the L7 Pod). The L4 Pod can then forward the data message to another L7 Pod (if additional service processing is required and the L7 services are split into different Pods) or to its next destination (e.g., out of the network, to a logical network endpoint, etc.).

Figure 17:
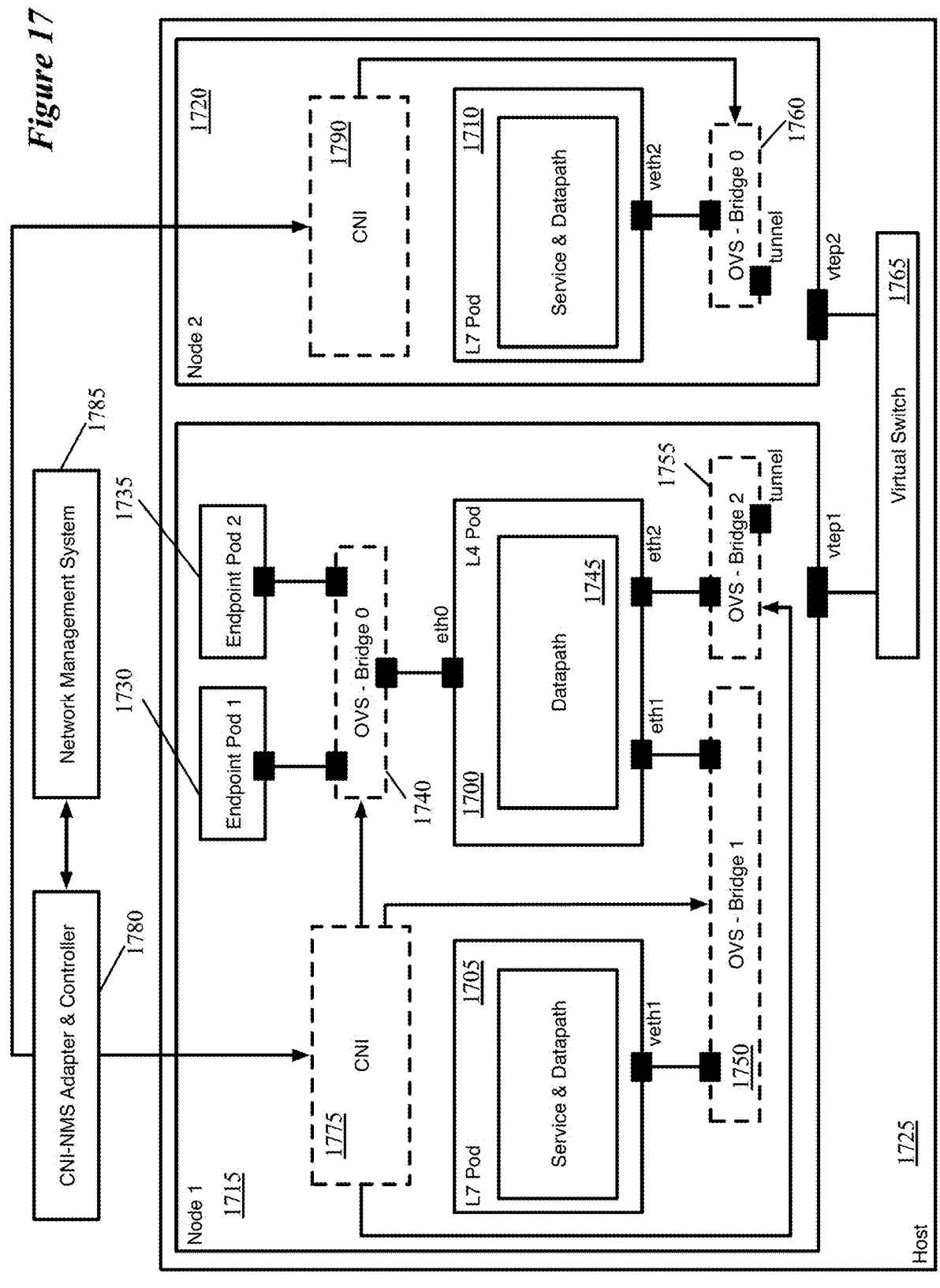
FIG. 17 conceptually illustrates the L2 constructs used to connect an L4 Pod to a first L7 Pod on the same node as the L4 Pod as well as to a second L7 Pod on a different node.

In some embodiments, the L2 constructs used to transmit the data messages between the L4 Pods and L7 Pods are also configured by the network management system. These L2 constructs depend on the type of networking used in the container cluster as well as whether the L7 Pod is on the same node as the L4 Pod (and, if on different nodes, whether the nodes execute on the same host computer). FIG. 17 conceptually illustrates the L2 constructs used to connect an L4 Pod 1700 to a first L7 Pod 1705 on the same node 1715 as the L4 Pod 1700 as well as to a second L7 Pod 1710 on a different node 1720. Both of the nodes 1715 and 1720 execute on the same host computer 1725 in this case (e.g., as separate virtual machines running on top of the same hypervisor).

In this example, additional endpoint pods 1730 and 1735 operate on the node 1715. These endpoint Pods 1730 and 1735 are connected to logical switches that, in turn, each connect to one of the logical routers implemented by the L4 Pod 1700. As such, the endpoint Pods 1730 and 1735 connect to a primary interface (eth0) of the L4 Pod 1700 via an L2 construct. In this case, the L2 construct is an Open vSwitch (OVS) bridge 1740 that executes within the node 1715. It should be noted that the endpoint Pods, or other endpoint Pods, can connect to this eth0 interface of the L4 Pod if they execute on other nodes (or even on other hosts) via additional L2 constructs (e.g., a combination of OVS bridges, tunnels, virtual switches, and/or physical network hardware).

In some embodiments, the eth0 interface of the L4 Pod 1700 also receives traffic sent to the T0 logical router uplink interface or interfaces (i.e., from external networks via the ingress mechanism of the Kubernetes cluster) and is the interface of the L4 Pod via which traffic is sent to the external network (i.e., from the T0 uplink interface). In other embodiments, however, a separate interface is configured on the L4 Pod for each uplink interface assigned to the L4 Pod by the network management system (e.g., based on network interface configuration generated by the network management system according to user configuration of the uplinks).

The L4 Pod 1700 includes a separate interface for each L7 Pod to which it sends data messages for L7 service processing. In the example, there are two L7 Pods 1705 and 1710 and thus two additional interfaces (eth1 and eth2). The two L7 Pods 1705 and 1710 may perform the same service for the same logical router (i.e., with data traffic load balanced across the two pods), two different services for the same logical router, or services for different logical routers (either the same service or different services). Each of the L7 Pods 1705 and 1710 executes a service module and a datapath. These datapaths do not need to perform logical forwarding for (potentially) multiple logical routers, but instead handle the passing of incoming data traffic between the respective interfaces (veth1 for the first L7 Pod 1705 and veth2 for the second L7 Pod 1710) and the service modules.

Internally, the datapath 1745 of the L4 Pod implements various logical router ports depending on the number of logical routers that it implements and the number of logical services for each of those logical routers. In some embodiments, the datapath 1745 receives data messages on one or more separate logical router ports for each logical router that the L4 Pod 1700 implements. Specifically, in some embodiments, the datapath 1745 implements a southbound logical router port (i.e., facing the logical network) for each T1 logical router as well as one or more northbound uplink ports (i.e., facing the external network) for its T0 logical router (i.e., one per uplink interface group defined for the T0 logical router), as well as the internal ports between these logical routers. Incoming data traffic (sent to the T0 logical router the external network) is received by the datapath at the uplink port, whereas outgoing data traffic (sent to a T1 logical router from a logical network endpoint underneath that logical router) is received at the southbound logical router port.

In addition, the datapath 1745 implements at least one separate service port for each logical router that includes L7 services. In some embodiments, the logical router is defined to include a separate service port for each L7 service (assuming those services are implemented by different L7 Pods). In other embodiments, the logical router is defined with a single service port for all L7 services. In the former case, if a particular service is load balanced between multiple L7 Pods, some embodiments define separate service ports for each of the L7 Pods. In other embodiments, because the service ports are defined by the network management system while the number of L7 Pods for a given service is determined by the L4 Pod (e.g., based on current load), one service port is used for each L7 service irrespective of the number of L7 Pods implementing a given service.

In some embodiments, each logical router service port implemented by the datapath 1700 is linked with one or more of the L4 Pod ports. For instance, if the two L7 Pods 1705 and 1710 perform services for two different logical routers, then a different logical router service port is linked with the two ports eth1 and eth2 of the L4 Pod 1700. If the two L7 Pods 1705 and 1710 perform the same service for the same logical router, some embodiments associate a single logical router service port with each of the two L4 Pod ports (with a load balancing decision by the datapath determining to which Pod port a given data message is sent).

As noted, the L2 constructs between the L4 Pod and the L7 Pods (e.g., the L2 construct 1365 in FIG. 13) may vary between different implementations (e.g., depending on the type of datacenter in which the Kubernetes cluster is hosted). In this example, the nodes 1715 and 1720 are virtual machines that execute on a hypervisor of the same host computer (e.g., an ESX host). Thus, the constructs used to connect the L4 Pod 1700 to the L7 Pod 1705 on the same node 1715 remain internal to the node. Specifically, an OVS bridge 1750 (e.g., a type of virtual switching element) is used, to which eth1 of the L4 Pod 1700 and veth1 of the L7 Pod 1705 both attach. Data messages can be sent from the L4 Pod 1700 to the L7 Pod 1705 via this bridge 1750 by encapsulating the data message using the MAC and/or IP address of veth1 as the outer destination address in some embodiments. Similarly, these data messages can be returned to the L4 Pod 1700 via the bridge 1750 by the L7 Pod 1705 encapsulating the data message using the MAC and/or IP address of eth1 as the outer destination address.

The second port of the L4 Pod 1700 (eth2) connects to a separate OVS bridge 1755 for carrying data traffic to the L7 Pod 1710 on the other node 1720. In this case, the bridge 1755 includes a tunnel port. A corresponding bridge 1760 with a tunnel port is defined on the second node 1720, to which the L7 Pod 1710 connects. These tunnel ports are linked to virtual tunnel endpoints (VTEPs) of the nodes 1715 and 1720 that connect to a virtual switch 1765 executing on the node (e.g., in the hypervisor of the node). Thus, a data message sent from the L4 Pod 1700 to the L7 Pod 1710 on the second node 1720 is initially sent to the OVS bridge 1755 using the L7 Pod 1710 as a destination address for encapsulation. In some embodiments, the OVS bridge 1755 forwards the data message to its tunnel port based on this destination address. Some embodiments apply a second encapsulation using the tunnel port of the OVS bridge 1760 on the second node 1720 as the outer destination address, such that the virtual switch 1765 directs the data message to the OVS bridge 1760. This bridge then delivers the data message to the L7 Pod 1710.

In some embodiments, the OVS bridges 1740, 1750, and 1755 on the node 1715 are configured by a container network interface (CNI) plugin 1775. The CNI plugin 1775 may include multiple components that configure networking on the node 1715. The CNI plugin 1775 communicates with a CNI-NMS (network management system) adapter and controller 1780 that is also deployed within the Kubernetes cluster in some embodiments. In some embodiments, the CNI-NMS adapter and controller 1780 acts as an interface between the network management system 1785 (e.g., the management plane) and the Kubernetes master node (not shown) to (i) report certain Kubernetes configuration information to the network management system 1785 (e.g., Pod creation and deletion updates) and (ii) provide inter-Pod networking configuration data to the CNI plugin 1775 (as well as the CNI plugin 1790 on the second node 1720 and to CNI plugins on other nodes in the cluster).

The CNI plugin 1775 receives inter-Pod networking configuration data via the CNI-NMS adapter and controller 1780 and uses this data to configure the OVS bridges 1740, 1750, and 1755 on the node. In some embodiments, at least a subset of these OVS bridges perform logical networking (e.g., the OVS bridge 1740 performing logical networking for the endpoint Pods 1730 and 1735) based on this configuration data. The CNI plugin 1775 also configures the inter-Pod connectivity between the L4 Pod 1700 and the L7 Pods 1705 and 1710 that is described in detail above. Because the interfaces that connect to these OVS bridges are defined by the network management system 1785, the networking between the interfaces is also defined at the network management system.

The CNI plugin 1775, in some embodiments, includes multiple components. In some embodiments, these components include an agent for communicating with the CNI-NMS controller 1780 (e.g., to receive inter-Pod networking configuration) and an OVS daemon that translates the received networking configuration into configuration data specific to OVS (e.g., flow entries). The CNI plugin 1790 on the second node 1720 performs similar operations to configure the OVS bridge 1760 (and any other bridges on the node).

In the above example, the L7 Pods both operate on nodes executing on the same host computer as the L4 Pod. If an L7 Pod executes on a node operating on a different host computer than the L4 Pod, some embodiments also tunnel the data message via another underlay network to the other node (i.e., via the physical network of the datacenter hosting the Kubernetes cluster). In addition, in the above example the L4 Pod has separate interfaces, connecting to separate bridges executing on its node, for each L7 Pod to which the L4 Pod sends data messages for service processing. In other embodiments, a single bridge is used with one L4 Pod interface shared by data traffic to and from all of the L7 Pods. In some such embodiments, different VLANs are used (for different sub-interfaces) for traffic with each L7 Pod in order to differentiate the traffic to and from the different L7 Pods.

Due to varying levels of traffic, in some embodiments the amount of resources in the container cluster devoted to the L4 Pods or to the L7 Pods for a specific service of a specific logical router may not be enough (or, conversely, may be more than are needed). To monitor the usage of the different groups of Pods, the network management system of some embodiments defines an orchestrator within the Kubernetes cluster (e.g., as part of the control plane). The orchestrator, in some embodiments, is a custom operator that communicates with both the Kubernetes control plane and the network management system.

Figure 18:
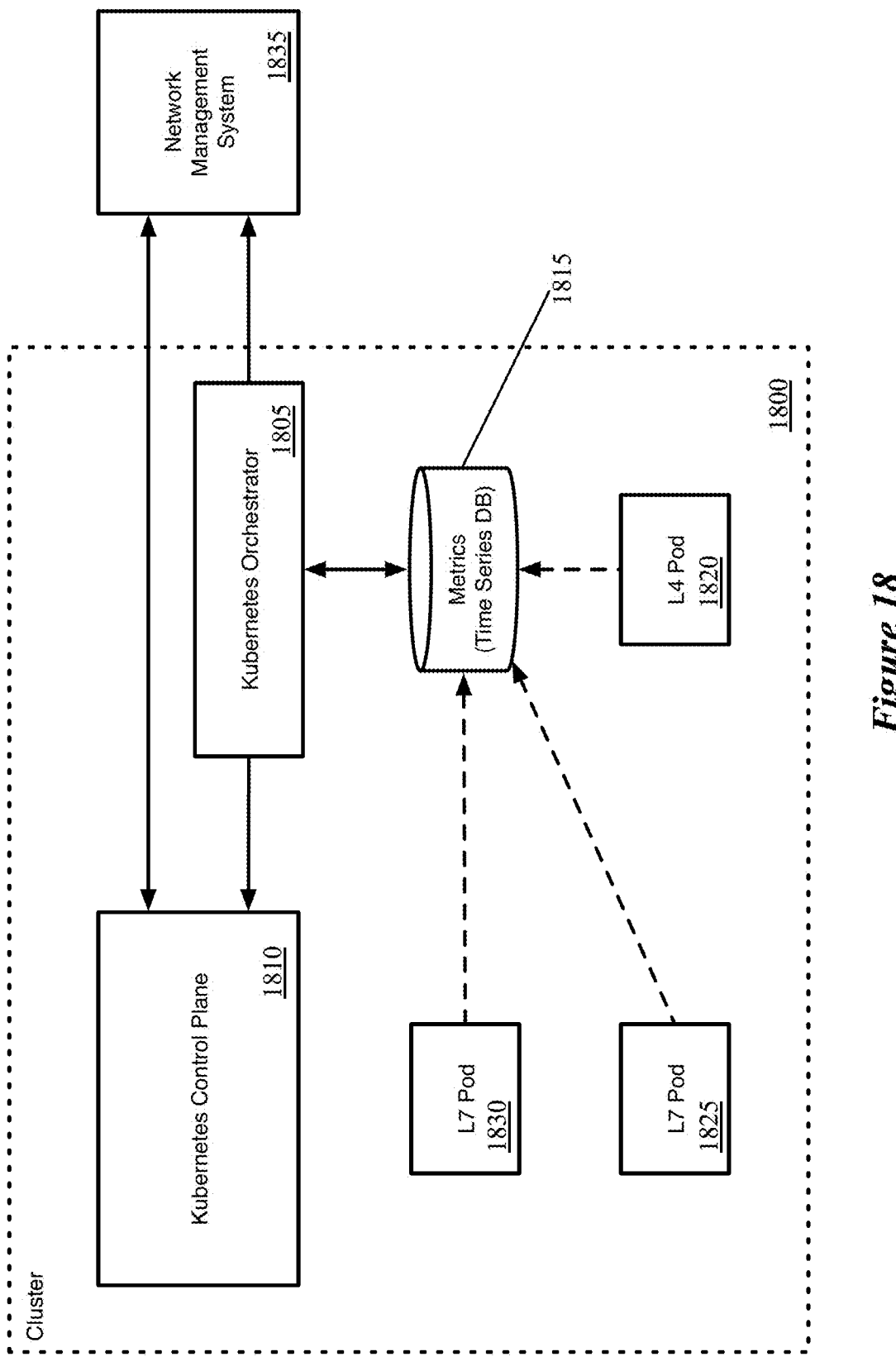
FIG. 18 conceptually illustrates a Kubernetes cluster with an orchestrator and a Kubernetes control plane.

FIG. 18 conceptually illustrates a Kubernetes cluster 1800 with such an orchestrator 1805 and a Kubernetes control plane 1810. In some embodiments, the orchestrator 1805 is part of the control plane 1810 and operates on the same master node as other control plane components, while in other embodiments the orchestrator 1805 is separate from the control plane 1810 and may operate on a separate node of the cluster 1800.

The Kubernetes cluster 1800 also includes a metrics storage 1815, which may be stored on the master node or elsewhere in the cluster 1800. The metrics storage 1815, in some embodiments, is a time series database that stores various metrics for all of the Pods executing in the cluster 1800, which includes the L4 Pod 1820 and the L7 Pods 1825-1830. These Pods report their metrics to the storage 1815, which is accessible to the orchestrator 1805. The reported metrics include the number of data messages processed at each Pod as well as other resource usage indicators (memory usage, processor usage, etc.).

The orchestrator 1805 monitors these metrics 1815 to determine when either (i) a group of Pods is overutilized and needs additional resources or (ii) a group of Pods is underutilized and can have the number of Pods in the group reduced. Upon making such a determination, the orchestrator notifies the external network management system 1835 (e.g., the management plane of the network management system. In some embodiments, the orchestrator 1805 also directly notifies cluster control plane 1810 (e.g., the API server). In some embodiments, the process for scaling a group of Pods is different depending on whether the L4 Pods or one of the groups of L7 Pods (i.e., the L7 Pods for a particular service of a particular logical router) need to be scaled.

FIG. 19 conceptually illustrates a process 1900 of some embodiments for scaling a group of L7 Pods that implement a particular L7 service for a particular logical router. In some embodiments, the process 1900 is performed by a network management system (e.g., by the management plane, central control plane, or a combination thereof) external to a Kubernetes cluster in which the L7 Pods implement the services for the logical router.

As shown, the process 1900 begins by receiving (at 1905) a message from a Kubernetes orchestrator to add an L7 Pod to the group of Pods implementing a particular service for a particular logical router. As noted, the orchestrator, in some embodiments, monitors metrics for the Pods currently implementing the particular service (as well as the Pods implementing other services for the logical router and any other logical routers implemented in the cluster). Upon determining, based on resource usage or estimates thereof, that an additional Pod is needed for the group, the orchestrator notifies the network management system.

The process 1900 defines (at 1910) an inter-Pod interface for the new L7 Pod that will be deployed, enabling this new Pod to connect to the L4 Pods that implement the forwarding for the particular logical router. In some embodiments, all of the interfaces for L7 Pods (and the L4 Pod interface(s) that connect to these interfaces are on the same subnet so that this traffic can be sent via the same L2 construct (e.g., the same OVS bridge).

The process 1900 also modifies (at 1915) the redirection rules for the particular service of the particular logical router to include the new Pod interface as a potential destination. In some embodiments, each redirection rule relating to the particular service is updated to include the additional Pod. In other embodiments, however, the redirection rules refer to a group definition for the group of L7 Pods implementing the particular service. In the latter case, only the group definition needs to be updated, as the redirection rules will automatically refer to the updated group definition instead. The process 1900 also modifies (at 1920) the span of the service configuration for the particular L7 service of the particular logical router to include the new Pod.

Once the span is updated, the redirection rules modified, and the inter-Pod interface defined, the process 1900 provides (at 1925) this generated information to the L4 Pod or Pods. This enables one of the L4 Pods to initiate the deployment process for the L7 Pod as described above (i.e., by contacting the Kubernetes API server to deploy the new Pod and then configuring the newly deployed Pod). Because the span of the service configuration is modified to include the new Pod, once instantiated the database client on this new Pod will retrieve the service configuration. On the L4 Pod, the network management system agent updates the datapath configuration to account for the new L7 Pod (either modifying the redirection rules or updating the referenced group definition for the particular service). In some embodiments, the network management system also configures the OVS bridge(s) for connecting the L4 Pod to the L7 Pod based on the defined new interface of the L7 Pod (and, if using a separate interface for each L7 Pod, a new interface of the L4 Pod).

Similarly, when the orchestrator determines that the number of L7 Pods should be reduced, the orchestrator notifies the network management system. Either the orchestrator directly or the network management system (directly or via the Pod configuration agent executing in the L4 Pod) contacts the Kubernetes API server to delete the superfluous L7 Pod. In addition, the network management system modifies the span of the service configuration data and updates the redirection rule, this time to remove the deleted L7 Pod as an option for redirected data messages.

Scaling of the L4 Pods involves additional complexity in some embodiments compared to scaling a group of L7 Pod, because the L4 Pods also connect to the external router(s). FIG. 20 conceptually illustrates a process 2000 of some embodiments for scaling a group of L4 Pods that implement routing for a group of logical routers (e.g., a T0 logical router and multiple T1 logical routers) in a Kubernetes cluster. In some embodiments, the process 2000 is performed by a network management system (e.g., by the management plane, central control plane, or a combination thereof) external to a Kubernetes cluster in which the L4 Pods implement the logical routers.

As shown, the process 2000 begins by receiving (at 2005) a message from a Kubernetes orchestrator to add an L7 Pod to the group of Pods implementing the logical routers in the cluster. As noted, the orchestrator, in some embodiments, monitors metrics for the currently deployed L4 Pods (as well as the groups of L7 Pods implementing services for the logical routers). Upon determining, based on resource usage or estimates thereof, that an additional L4 Pod is needed to handle the current traffic load, the orchestrator notifies the network management system.

The process 2000 then sends (at 2005) a command to the Kubernetes control plane to create a new L4 Pod associated with the L4 logical router CR defined at initial deployment of the logical routers in the cluster. In other embodiments, it should be noted, the orchestrator directly commands the API server to instantiate the new L4 Pod when notifying the network management system of the need for the new Pod.

In some embodiments, the network management treats the scaling of the L4 Pod as the addition of another uplink interface (or multiple interfaces) for the T0 logical router. As such, the process 2000 defines (at 2015) one or more new uplink interfaces for the T0 logical router and associates these interfaces with the new L4 Pod. The definition of these new uplink interfaces includes assignment of new network addresses to the uplinks. In some embodiments, other uplink definition data may include the VLAN to which the uplink connects, the data link (e.g., MAC) address, as well as other networking details (MTU, etc.).

As indicated above, in some embodiments the definition of the T0 logical router with the network management system includes specification of uplink interface groups. The T0 logical router is defined such that one member of each uplink interface group will be assigned to each L4 Pod, so in some embodiments the network management system defines one uplink interface from each group for the new L4 Pod. In some embodiments, the Kubernetes cluster may span multiple physical failure domains, and in this case the connectivity information for each interface group is defined separately per failure domain. While the available network addresses for an interface group should be in the same subnet irrespective of the failure domain (e.g., based on connectivity to the same external router), the VLAN connectivity (i.e., the VLAN to which the uplink interface directly connects) may differ across domains. As such, some of the uplink interface specification may depend on the failure domain in which the new L4 Pod will be located in some embodiments.

The process 2000 also modifies (at 2020) the span of the logical routing configuration to include the new L4 Pod. Whereas the scaling of an L7 Pod group affects the redirection rule configuration, scaling of the L4 Pod has no effect on these rules (i.e., the same rules are distributed to each of the L4 Pods, including the new L4 Pod). In this sense, the scaling of the L4 Pod can be viewed as the scaling of the first-tier logical router, with the second-tier logical router configurations all staying constant.

However, because new uplinks are defined, the connection with the external router(s) changes and needs to be accounted for. As such, the process 2000 defines (at 2025) a BGP configuration for the new L4 Pod (or another routing protocol configuration, if a different routing protocol is used). This BGP configuration, in some embodiments, identifies the external routers with which the BGP thread executing for the new L4 Pod datapath should peer in order to attract traffic and learn routes for outgoing traffic. In some embodiments, the BGP configuration is the same for each of the L4 Pods. Once peered, the BGP thread will advertise the same routes to the external router(s) as the other L4 Pods.

Ideally, the new L4 Pod should learn all of the routes from the external router(s) that have already been learned by the existing L4 Pods. As such, some embodiments also configure the external router(s) with a range of neighbors that the external routers expect to initiate a connection and start a routing protocol session. Some embodiments define the new uplink interfaces within this range so that when these uplinks are added they are within the configured range for the external router. This enables easy initiation of a connection so that the L4 Pod can learn routes from the external router and advertise routes for the logical network.

Finally, once the uplinks are defined, the configuration span is updated, and the BGP configuration is generated, the process 2000 provides (at 2030) this information to the newly deployed L4 Pod. The network management system agent on that newly deployed Pod configures the datapath according to the received configuration and the L4 Pod can begin receiving and processing its share of traffic. In some embodiments, the network management system also defines one or more redirection interfaces and configures the OVS bridge(s) to which the redirection interfaces connect in order for the new L4 Pod to send traffic to and receive traffic back from the various L7 Pods implementing services for the logical routers.

Once the new L4 Pod is fully configured, the Pod joins the cluster with the other L4 Pods and can start receiving data traffic. Based on the new L4 Pod initiating a peering connection with external routers, the L4 Pod attracts data traffic from these external routers. For outgoing traffic, the forwarding elements implementing the logical network throughout the Kuberentes cluster (e.g., OVS bridges located at the nodes) are configured to begin including the new L4 Pod in the list of available L4 Pods when sending traffic to external networks.

When the orchestrator determines that the number of L4 Pods should be reduced, the orchestrator notifies the network management system. The network management system deletes the uplink interfaces and notes that the uplink addresses can be re-used in the future (e.g., adds these back to a pool of available IP addresses). Either the orchestrator or network management system commands the API server to delete one of the L4 Pods. In some embodiments, the external router(s) will detect that the L4 Pod is no longer available and stop sending data messages to that Pod.

In some embodiments, the L4 Pods are stateful (either for processing that occurs at the L4 Pod or because the L4 Pod redirects traffic for stateful L7 processing to the same set of L7 Pods for a given connection), so data traffic should be sent to the same L4 Pod even after the cluster of such Pods is either increased or decreased (except that any connections being sent to a deleted L4 Pod will obviously need to move to a different L4 Pod). As such, some embodiments use a consistent hashing when selecting between L4 Pods for a connection. Consistent hashing schemes tend to keep the assignment of existing connections (for either all connections or a large majority of these connections) invariant under a change in cluster membership (other than the reassignment of connections from a deleted cluster member).

Figure 21:
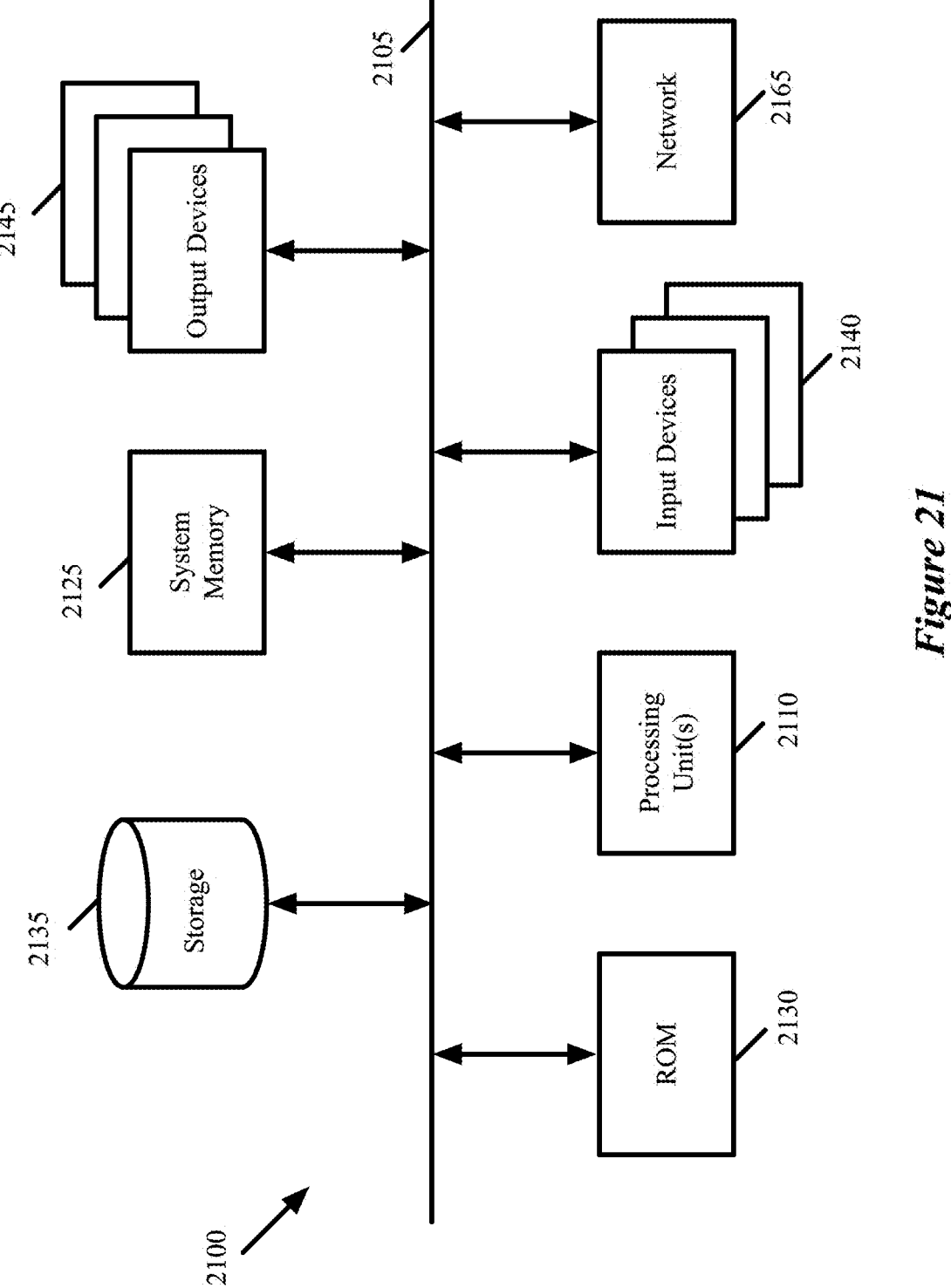
FIG. 21 conceptually illustrates an electronic system with which some embodiments of the invention are implemented.

FIG. 21 conceptually illustrates an electronic system 2100 with which some embodiments of the invention are implemented. The electronic system 2100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the system memory 2125, and the permanent storage device 2135.

From these various memory units, the processing unit(s) 2110 retrieve instructions to execute and data to process in order to execute the processes of the invention. The processing unit(s) may be a single processor or a multi-core processor in different embodiments.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random-access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"). The output devices 2145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples electronic system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6, 7, 9-11, 14, 15, 19, and 20) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for operating a network management system, the method comprising:

receiving a first notification from a Kubernetes cluster that a first set of Pods requires scaling to include an additional Pod for processing data messages between a logical network and external networks, the Kubernete cluster comprising a first set of Pods and a second set of Pods, the first set of Pods being associated with forwarding operations of the logical network, the second set of Pods being association with service operations;

providing configuration data to the additional Pod; and configuring an interface of the additional Pod to communicate with an external router of the external network.

2. The method of claim 1, further comprising defining at least a new interface for processing data messages between the logical network and external networks.

3. The method of claim 1, wherein each of the first set of Pods is configured to perform logical forwarding operations for logical routers of the Kubernetes cluster.

4. The method of claim 1, wherein each of the second set of Pods is configured to perform layer 7 (L7) service operations.

5. The method of claim 1, wherein the additional Pod is configured to send traffic to external network via the external router.

6. The method of claim 1, wherein the Kubernete cluster comprises a Kubernete control component configured to send the notification.

7. The method of claim 6, wherein the Kubernetes control plane component is an orchestrator defined to monitor the first and second sets of Pods.

8. The method of claim 7, wherein the orchestrator receives metrics reported by the Pods relating to processing load and determines when additional Pods are needed for the first and second sets of Pods.

9. The method of claim 1, wherein the additional comprises is a first additional Pod, the method further comprising:

receiving a second notification that the second set of Pods requires scaling to include a second additional Pod for a particular L7 service for a particular logical router; and modifying a span of configuration data for the particular L7 service for the particular logical router to include the second additional Pod.

10. The method of claim 9, further comprising distributing the configuration data for the particular L7 service for the particular logical router to the second additional Pod.

11. The method of claim 9, further comprising modifying redirection rules for the first set of Pods to redirect data messages requiring the particular L7 service for the particular logical router to include the second additional Pod in addition to previously instantiated Pods for the particular L7 service for the particular logical router.

12. The method of claim 1, wherein the additional Pod initiates a routing protocol sessions with the external router.

13. The method of claim 1, configuring the additional Pod to redirect data messages to Pods in the second set of Pods for the second set of Pods to perform L7 service operations on the redirected data messages.

14. The method of claim 1, further comprising:

receiving a notification that the first set of Pods requires reduction of a number of Pods in the first set of Pods and that a particular Pod from the first set of Pods will be deleted; and removing definition of interfaces associated with the particular Pod in the network management system.

15. The method of claim 1, further comprising receiving a notification that the first set of Pods requires reduction of a number of Pods in the first set of Pods and that a particular Pod from the first set of Pods will be deleted; and removing definition of interfaces associated with the particular Pod in the network management system.

16. A non-transitory machine-readable medium storing a program which when executed by at least one processing unit implements a network management system for configuring a plurality of logical routers of a logical network, the program comprising sets of instructions for:

receiving a first notification from a Kubernetes cluster that a first set of Pods requires scaling to include an additional Pod for processing data messages between the plurality of logical routers of the logical network and external networks, the Kubernete cluster comprising a first set of Pods and a second set of Pods, the first set of Pods being associated with forwarding operations of the logical network, the second set of Pods being association with service operations;

providing configuration data to the additional Pod; and configuring an interface of the additional Pod to communicate with an external router of the external network.

17. The non-transitory machine-readable medium claim 16, wherein each of the first set of Pods is configured to perform logical forwarding operations for logical routers of the Kubernetes cluster.

18. The non-transitory machine-readable medium claim 16, wherein each of the second set of Pods is configured to perform layer 7 (L7) service operations.

19. The non-transitory machine-readable medium claim 16, wherein the additional Pod is configured to send traffic to external network via the external router.

20. The non-transitory machine-readable medium claim 16, wherein the Kubernete cluster comprises a Kubernete control component configured to send the notification.

* * * * *